(12) United States Patent
Dorsey et al.

(10) Patent No.: US 8,170,606 B2
(45) Date of Patent: *May 1, 2012

(54) DYNAMIC THERMAL CONTROL FOR WIRELESS TRANSCEIVERS

(75) Inventors: John G. Dorsey, San Francisco, CA (US); William C. Athas, San Jose, CA (US)

(73) Assignee: Apple Inc., Cupertino, CA (US)

( * ) Notice: Subject to any disclaimer, the term of this patent is extended or adjusted under 35 U.S.C. 154(b) by 770 days.

This patent is subject to a terminal disclaimer.

(21) Appl. No.: 12/288,125

(22) Filed: Oct. 15, 2008

(65) Prior Publication Data

US 2010/0091747 A1    Apr. 15, 2010

(51) Int. Cl.
*H04M 1/00* (2006.01)
(52) U.S. Cl. ............. 455/552.1; 455/553.1; 455/73; 455/69; 455/550.1; 455/90.2; 370/311; 370/328; 370/338
(58) Field of Classification Search ............ 455/73, 455/127.5, 552.1, 553.1, 572–574, 550.1; 370/311, 328, 338
See application file for complete search history.

(56) References Cited

U.S. PATENT DOCUMENTS

| | | | |
|---|---|---|---|
| 5,422,931 A * | 6/1995 | Austin-Lazarus et al. . | 455/553.1 |
| 6,195,535 B1 * | 2/2001 | Kurchuk ............. | 455/83 |
| 6,272,327 B1 * | 8/2001 | Kurchuk et al. ......... | 455/217 |
| 6,795,419 B2 | 9/2004 | Parantainen et al. | |
| 6,930,981 B2 | 8/2005 | Gopalakrishnan et al. | |
| 7,120,427 B1 * | 10/2006 | Adams et al. ......... | 455/418 |
| 7,171,570 B2 | 1/2007 | Cox et al. | |
| 7,197,069 B2 | 3/2007 | Agazzi et al. | |
| 7,240,223 B2 | 7/2007 | de Cesare et al. | |
| 7,273,773 B2 * | 9/2007 | Yamazaki et al. ......... | 438/158 |
| 7,302,595 B2 | 11/2007 | De Cesare et al. | |
| 7,340,622 B2 | 3/2008 | Cox et al. | |
| 7,590,429 B2 * | 9/2009 | Hansen et al. ........... | 455/562.1 |
| 7,599,325 B2 * | 10/2009 | Lin et al. ............. | 370/328 |
| 7,676,198 B2 * | 3/2010 | Mahany ............... | 455/69 |
| 7,873,385 B2 * | 1/2011 | Boireau et al. ......... | 455/553.1 |
| 2003/0193923 A1 * | 10/2003 | Abdelgany et al. ....... | 370/342 |
| 2007/0242688 A1 * | 10/2007 | McFarland ............ | 370/445 |
| 2008/0108331 A1 * | 5/2008 | Jin et al. ............ | 455/414.1 |
| 2008/0274704 A1 * | 11/2008 | Barzilay et al. ......... | 455/76 |
| 2008/0287080 A1 * | 11/2008 | Camp et al. ........... | 455/127.5 |
| 2009/0215404 A1 * | 8/2009 | Kesavan et al. ......... | 455/73 |
| 2011/0299434 A1 * | 12/2011 | Gudem et al. .......... | 370/278 |

* cited by examiner

*Primary Examiner* — Sharad Rampuria
(74) *Attorney, Agent, or Firm* — Gazdzinski & Associates, PC

(57) ABSTRACT

Methods and apparatus for dynamic thermal management and control within, e.g., small form-factor wireless devices such as laptop computers or cellular "smartphones". In one embodiment, a thermal management system monitors the temperature (or other relevant criteria) for one or more components, and implements different operating states within the wireless transceiver (e.g., Wi-Fi™ or WiMAX transceiver) so as to both reduce thermal output and minimize disruption to the wireless link and/or user experience. In another embodiment, a wireless client may communicate with other clients, and/or access points, so as to cooperatively provide more options for thermal management. In addition, methods and apparatus employing "high performance" (e.g., high power output or high data rate) radios within aggressively small industrial designs are also disclosed.

23 Claims, 11 Drawing Sheets

| Parameter | Comments |
| --- | --- |
| Modulation and Coding Scheme | Determines the PHY rate on a fine-grained basis. Typically the parameter adjusted for purposes of RF channel adaptation. |
| Number of spatial streams (1-4) | Decoder complexity increases significantly with multi-stream modulations, but these can yield substantial gains in throughout and range |
| Spatial Multiplexing power save mode | Forces the use of single-stream modulations for incoming signals, allowing extra receive paths and complex decoders to be turned off. |
| Channel bandwidth (20 MHz or 40 MHz) | The wider channel offers more than twice the PHY rate, but ADC power increases significantly. |

FIG. 4

| MCS Index | Number of spatial streams | Modulation | Coding rate | $N_{ES}$ | | $N_{SD}$ | | $N_{CBPS}$ | | Data Rate (in Mbps) (GI=800ns) | | Data Rate (in Mbps) (GI=400ns) | |
|---|---|---|---|---|---|---|---|---|---|---|---|---|---|
| | | | | 20MHz | 40MHz | 20MHz | 40MHz | 20MHz | 40MHz | 20MHz | 40MHz | 20MHz | 40MHz |
| 0 | 1 | BPSK | 1/2 | 1 | 1 | 52 | 108 | 52 | 108 | 6.5 | 13.5 | 7 2/9 | 15 |
| 1 | 1 | QPSK | 1/2 | 1 | 1 | 52 | 108 | 104 | 216 | 13 | 27 | 14 4/9 | 30 |
| 2 | 1 | QPSK | 3/4 | 1 | 1 | 52 | 108 | 104 | 216 | 19.5 | 40.5 | 21 2/3 | 45 |
| 3 | 1 | 16-QAM | 1/2 | 1 | 1 | 52 | 108 | 208 | 432 | 26 | 54 | 28 8/9 | 60 |
| 4 | 1 | 16-QAM | 3/4 | 1 | 1 | 52 | 108 | 208 | 432 | 39 | 81 | 43 1/3 | 90 |
| 5 | 1 | 64-QAM | 2/3 | 1 | 1 | 52 | 108 | 312 | 648 | 52 | 108 | 57 7/9 | 120 |
| 6 | 1 | 64-QAM | 3/4 | 1 | 1 | 52 | 108 | 312 | 648 | 58.5 | 121.5 | 65 | 135 |
| 7 | 1 | 64-QAM | 5/6 | 1 | 1 | 52 | 108 | 312 | 648 | 65 | 135 | 72 2/9 | 157.5 |
| 8 | 2 | BPSK | 1/2 | 1 | 1 | 52 | 108 | 104 | 216 | 13 | 27 | 14 4/9 | 30 |
| 9 | 2 | QPSK | 1/2 | 1 | 1 | 52 | 108 | 208 | 432 | 26 | 54 | 28 8/9 | 60 |
| 10 | 2 | QPSK | 3/4 | 1 | 1 | 52 | 108 | 208 | 432 | 39 | 81 | 43 1/3 | 90 |
| 11 | 2 | 16-QAM | 1/2 | 1 | 1 | 52 | 108 | 416 | 864 | 52 | 108 | 57 7/9 | 120 |
| 12 | 2 | 16-QAM | 3/4 | 1 | 1 | 52 | 108 | 416 | 864 | 78 | 162 | 86 2/3 | 180 |
| 13 | 2 | 64-QAM | 2/3 | 1 | 1 | 52 | 108 | 624 | 1296 | 104 | 216 | 115 5/9 | 240 |
| 14 | 2 | 64-QAM | 3/4 | 1 | 1 | 52 | 108 | 624 | 1296 | 117 | 243 | 130 | 270 |
| 15 | 2 | 64-QAM | 5/6 | 1 | 1 | 52 | 108 | 624 | 1296 | 130 | 270 | 144 4/9 | 300 |
| 16 | 3 | BPSK | 1/2 | 2 | 2 | 52 | 108 | 156 | 324 | 19.50 | 40.50 | 21.67 | 45.00 |
| 17 | 3 | QPSK | 1/2 | 2 | 2 | 52 | 108 | 312 | 648 | 39.00 | 81.00 | 43.33 | 90.00 |
| 18 | 3 | QPSK | 3/4 | 2 | 2 | 52 | 108 | 312 | 648 | 58.50 | 121.50 | 65.00 | 135.00 |
| 19 | 3 | 16-QAM | 1/2 | 2 | 2 | 52 | 108 | 624 | 1296 | 78.00 | 162.00 | 86.67 | 180.00 |
| 20 | 3 | 16-QAM | 3/4 | 2 | 2 | 52 | 108 | 624 | 1296 | 117.00 | 243.00 | 130.00 | 270.00 |
| 21 | 3 | 64-QAM | 2/3 | 2 | 2 | 52 | 108 | 936 | 1944 | 156.00 | 324.00 | 173.33 | 360.00 |
| 22 | 3 | 64-QAM | 3/4 | 2 | 2 | 52 | 108 | 936 | 1944 | 175.50 | 364.50 | 195.00 | 405.00 |
| 23 | 3 | 64-QAM | 5/6 | 2 | 2 | 52 | 108 | 936 | 1944 | 195.00 | 405.00 | 216.67 | 450.00 |
| 24 | 4 | BPSK | 1/2 | 2 | 2 | 52 | 108 | 208 | 432 | 26.00 | 54.00 | 28.89 | 60.00 |
| 25 | 4 | QPSK | 1/2 | 2 | 2 | 52 | 108 | 416 | 864 | 52.00 | 108.00 | 57.78 | 120.00 |
| 26 | 4 | QPSK | 3/4 | 2 | 2 | 52 | 108 | 416 | 864 | 78.00 | 162.00 | 86.67 | 180.00 |
| 27 | 4 | 16-QAM | 1/2 | 2 | 2 | 52 | 108 | 832 | 1728 | 104.00 | 216.00 | 115.56 | 240.00 |
| 28 | 4 | 16-QAM | 3/4 | 2 | 2 | 52 | 108 | 832 | 1728 | 156.00 | 324.00 | 173.33 | 360.00 |
| 29 | 4 | 64-QAM | 2/3 | 2 | 2 | 52 | 108 | 1248 | 2592 | 208.00 | 432.00 | 231.11 | 480.00 |
| 30 | 4 | 64-QAM | 3/4 | 2 | 2 | 52 | 108 | 1248 | 2592 | 234.00 | 486.00 | 260.00 | 540.00 |
| 31 | 4 | 64-QAM | 5/6 | 2 | 2 | 52 | 108 | 1248 | 2592 | 260.00 | 540.00 | 288.89 | 600.00 |
| 32 | 1 | BPSK | 1/2 | 1 | 1 | | 48 | | 48 | | 6 | | 6.67 |

FIG. 4A

DYNAMIC THERMAL CONTROL FOR WIRELESS TRANSCEIVERS

PRIORITY AND RELATED APPLICATIONS

This application is related to U.S. patent application Ser. No. 12/288,027 filed contemporaneously herewith on Oct. 15, 2008 of the same title, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the present invention is directed to methods and apparatus for flexible modes of operation in a transceiver.

2. Description of Related Technology

Wireless technology enables a plurality of user devices (e.g., mobile telephones, hand-held devices such as PDAs, or laptop computers) to communicate without wires, thereby enabling a wide variety of desirable applications leveraging improved mobility and convenience for the user. As is well known, wireless transceiver operation utilizes a radio and modem subsystem to propagate electromagnetic signals. Unfortunately, the transmission of radio waves over distances and through certain types of environments may require a considerable amount of electrical power at the transmitter, and in many wireless applications the proper management of energy resources is a design limitation (having implications in both physical energy storage, and rate of power consumption). Furthermore, for certain mobile applications requiring small form factor designs, the heat generated by radio system operation and inefficiency may be another design constraint. Such heat may need to be dissipated (via conduction, convection and/or radiation) in order to prevent component damage or degradation (e.g., shortening of its operational lifetime).

A wireless Local Area Network (LAN) or WLAN, such as for example one compliant with IEEE Std. 802.11 ("Wi-Fi™"), is one exemplary wireless application providing network access via spread-spectrum or Orthogonal Frequency Division Multiplexing (OFDM) modulation techniques. WLAN was originally designed for generic wireless local area networking and does not require any network infrastructure. WLAN could originally support simple network topologies, including peer-to-peer "ad hoc" networks. In such simple ad hoc networks, communication links may be established directly from one wireless device to another, without involving intermediate access points. WLAN installations are highly popular for a wide-ranging audience including everyone from home users and small businesses operators to large corporations and even city-wide publicly offered access. The ease of WLAN installation/operation, along with a large amount of market penetration, as well as a plethora of WLAN capable devices (e.g. laptops, smartphones, etc.) help ensure WLAN's future growth and continued popularity.

The antennas on WLAN devices are generally inefficient in comparison to other radio technologies, in large part due to space and cost considerations. Furthermore, many WLAN end devices have form factor and usability requirements which additionally complicate antenna designs (such as removable PCMCIA cards). The ad hoc networking feature of WLAN transceivers, and wide variation in transceiver quality, creates unique radio design and coordination issues. In a typical WLAN operation, a considerable amount of power is consumed by the radio interface even within a small area. This relatively large power consumption is needed to improve wireless packet reception/transmission (i.e., reduce or substantially eliminate bit errors or required retransmissions) with nearby transceivers which may have disabilities such as poor sensitivity or antenna isolation, geographically-induced issues such as Rayleigh fading, etc.

WLAN power distributions have held generally stable over the years since adoption of the technology. High-end radio vendors have generally used silicon advances to improve performance rather than reduce power. The broad adoption of Orthogonal Frequency Division Multiplexing (OFDM) in 2003, and that of Multiple Input Multiple Output (MIMO) technologies in 2007, have kept active WLAN power levels above one Watt. The increased modulation and coding complexity foreseeable over the coming years suggests that in the near future, radios may be required to sustain more than three watts in real workloads.

This increased transceiver energy usage is accompanied by shrinking industrial designs. For example, first generation WLAN implementations (such as those manufactured by the Assignee hereof) were afforded the full volume of a PCMCIA card, while the current generation model (at the time of this writing) is a mere fraction of that space. As enclosures shrink, the radio module often moves closer to the surface, where energy dissipated as heat can be felt by users. At the same time, it becomes more difficult to fit a thermal solution to manage and distribute the heat effectively so as to avoid component damage (or initiation of a self-protection action such as a thermally-induced shutdown). Examples of thermal solutions include heat sinks, heat pipes, and fans. These may introduce significant cost, complexity, and even acoustic noise, all of which are undesirable.

Traditionally, the industrial design of consumer products specifies functional components prior to considerations of thermal management. Generally, desired features, form factor requirements, industrial design and components are considered first, while power behavior of components and resultant heat requirements are accepted and managed by designers. This style of design was recently changed to reflect the importance of thermal management. Newer approaches consider dynamic thermal constraints and "hot" components such as the CPU, memory controller, GPU, etc., and include methods to appropriately limit their energy dissipation. In one exemplary prior art system, a microcontroller continuously monitors thermal sensors sited throughout the system looking for temperature conditions that might affect user comfort or safety, as well as the correct operation of the components. The microcontroller notifies the operating system to adjust component performance in order to reduce energy dissipation, and thereby reduce thermal load This improved processing architecture enabled the design of smaller enclosures, while ensuring user and component safety.

U.S. Pat. No. 7,171,570 to Cox, et al. issued Jan. 30, 2007 and entitled "Method and apparatus for selectively increasing the operating speed of an electronic circuit" discloses a system that facilitates selectively increasing the operating frequency of an electronic circuit, such as a computer system.

The system begins by operating in a low-power state with the frequency and voltage of the electronic circuit set to low levels. Upon recognizing the need for performance beyond the low power level, the electronic circuit enters the first-intermediate power state. In this first-intermediate power state, the frequency and voltage are set to first-intermediate levels. Upon recognizing the need for performance beyond the first-intermediate power state, the electronic circuit enters the maximum-sustainable power state. In this power state, the frequency and voltage are set to maximum sustainable levels. Upon recognizing the need for performance beyond the maximum-sustainable power state, the electronic circuit temporarily enters a boosted power state beyond the maximum-sustainable power state. In this boosted power state, the frequency and voltages are set to levels beyond the maximum sustainable levels. See also U.S. Pat. No. 7,340,622.

U.S. Pat. No. 7,240,223 to de Cesare, et al. issued Jul. 3, 2007 and entitled "Method and apparatus for dynamic power management in a processor system" discloses a dynamic power management system which includes an operating system (OS) that causes a processor to operate in one of multiple run states that have different performance and/or power dissipation levels. The OS selects the run state in response to processor information (e.g., processor load) being monitored by the OS. The OS can predict future states of the processor information based on sampled processor information. The OS can take an average of the predicted and actual samples for comparison with a threshold to select a run state. The OS can track the number of consecutive saturated samples that occur during a selected window of samples. The OS can predict future processor information samples based on the number of consecutive saturated samples. See also U.S. Pat. No. 7,302,595.

The relationship between computational performance and energy is well understood by those of ordinary skill. The relevant literature contains many studies of component frequency and voltage adjustments (often discussed together) to balance latency and throughput considerations with power requirements. Conceptually, clock frequency and logic switching are directly related to both energy dissipation and instruction cycle execution. Therefore, because adjustments are reasonably fine-grained, one can fractionally decrease CPU speed and see a corresponding decrease in power consumption. Gate count (i.e., the number of logic gates used to realize a particular silicon or other implementation of a processor design) can also significantly impact power consumption.

Digital radio operation in many ways is significantly less flexible than generalized computing power management techniques in the prior art. Unlike a computing platform, which is largely a closed system unto itself, a wireless transceiver must broadcast and receive signals to many other transceivers, and therefore must comply with generally agreed upon messaging and radio protocols, which have specific timing requirements. Furthermore, certain forms of channel coding (e.g. Viterbi coding, Turbo coding, Reed Solomon, etc.) operate on large data blocks, and cannot be scaled down arbitrarily.

One common current working assumption is that WLAN transceivers need only "on" and "off" power states in order to manage power consumption. For instance, the "Power Save" mode defined by IEEE Std. 802.11 assumes that the sole way to reduce power is to completely disable the receiver, in effect deafening the system. Furthermore, the emphasis in radio power management has been on the idle case in which no application traffic is offered. When there is traffic to be serviced, the radio chooses a performance state determined by prevailing RF conditions, and dissipates as much energy as needed to implement that operational state.

Various approaches to wireless power consumption control are evidenced in the prior art. For example, U.S. Pat. No. 6,795,419 to Parantainen, et al. issued Sep. 21, 2004 and entitled "Wireless Telecommunications System Using Multislot Channel Allocation for Multimedia Broadcast/Multicast Service" discloses a method for operating a wireless telecommunication system and for providing a Multimedia Broadcast/Multicast Service MBMS broadcast transmission from a network operator to a mobile station. A first step determines a minimum bit rate requirement to broadcast a MBMS message and a number of radio blocks per time period that are required to satisfy the bit rate requirement. A second step allocates the determined number of radio blocks in accordance with a multislot transmission technique, wherein a plurality of time slots are used per frame, such that the mobile station is provided with at least one idle radio block between two active MBMS transmission periods. The at least one idle radio block may occur between two active MBMS radio blocks. A third step transmits the determined radio block allocation to the mobile station. In the preferred embodiment the step of determining may include a consideration of radio channel conditions and a multislot class of the mobile station. In one embodiment the step of allocating attempts to maximize the number of idle radio blocks and the mobile station, during the idle radio block, performs at least one of entering a reduced power consumption mode of operation, or entering a neighbor channel measurement mode of operation. In another embodiment the step of allocating allocates radio blocks so as to complete the data transmission within the shortest period of time.

U.S. Pat. No. 6,930,981 to Gopalakrishnan, et al. issued Aug. 16, 2005 and entitled "Method for Data Rate Selection in a Wireless Communication System" discloses data rate determination in a system where the available power fraction and available Walsh codes in each active leg are dynamically changing over time. This method adapts the rate (modulation and coding) based on the combined resource (power & code space) levels seen at each cell. The method results in maximization of the rate supportable by each cell given their resource-constrained situation while meeting the constraints of target packet or frame error rate and orthogonality. Furthermore, improved fast cell selection by the mobile results due to this approach that is based on knowledge of combined resource (power & code space) levels across the cells in the active set.

U.S. Pat. No. 7,197,069 to Agazzi, et al. issued Mar. 27, 2007 and entitled "Multi-pair Gigabit Ethernet Transceiver Having Adaptive Disabling of Circuit Elements" discloses various systems and methods for providing high speed decoding, enhanced power reduction and clock domain partitioning for a multi-pair gigabit Ethernet transceiver. ISI compensation is partitioned into two stages; a first stage compensates ISI components induced by characteristics of a transmitter's partial response pulse shaping filter in a demodulator, a second stage compensates ISI components induced by characteristics of a multi-pair transmission channel in a Viterbi decoder. High speed decoding is accomplished by reducing the DFE depth by providing an input signal from a multiple decision feedback equalizer to the Viterbi based on a tail value and a subset of coefficient values received from a unit depth decision-feedback equalizer. Power reduction is accomplished by adaptively truncating active taps in the NEXT, FEXT and echo cancellation filters, or by disabling decoder circuitry portions, as channel response characteristics allow. A receive clock signal is generated such that it is synchronous in frequency with analog sampling clock signals and has a particular phase offset with respect to one of the sampling clock signals. This phase offset is adjusted such that system performance degradation due to coupling of switching noise from the digital sections to the analog sections is substantially minimized.

Despite the foregoing, the prior art fails to provide an adequate solution for dynamic thermal control of wireless transceivers. Unlike power or heat management in a digital processor, some state transitions within radio systems can be significantly more disruptive to the operation of the transceiver (and user experience) than others. Hence, a minimally disruptive yet effective scheme for selecting and invoking such state transitions is needed.

Such an improved solution should operate seamlessly and without adversely impacting user experience on existing radio apparatus, and that of other wireless devices.

Moreover, such dynamic thermal management would be operable without requiring undue modification to implementations already deployed.

To these ends, thermal management schemes should minimally support "standalone" operation, where a dynamically managed client modifies its behavior without requiring non-enabled neighboring clients to do so in return.

In another aspect, multiple clients, each enabled by the present invention, would also advantageously work cooperatively to optimize a given client's heat dissipation and radio access requirements.

Lastly, such improved apparatus and methods would enable the use of high-performance radios in aggressively small industrial designs. In one exemplary usage scenario, certain IEEE Std. 802.11-compliant transmit power amplifiers (e.g., those with output powers in the 23-24 dBm range), which are conventionally considered "too hot" for portable computers or small handheld devices, could be utilized on such small mobile devices, thereby potentially providing higher range and/or data service capability.

SUMMARY OF THE INVENTION

The present invention satisfies the aforementioned needs by providing improved apparatus and methods for power and thermal management in wireless systems.

In a first aspect of the invention, a method for providing dynamic thermal control for a wireless transceiver is disclosed. In one embodiment, the transceiver is disposed in a portable wireless device, and the method comprises: determining that the value of a first parameter associated with the portable wireless device in a first operating state exceeds a threshold value; and switching the portable wireless transceiver from the first operating state to a second operating state based at least in part on the determining, the second operating state comprising one of a plurality of other operating states that dissipate less energy as heat within at least a portion of the device than the first operating state.

In one variant, the first parameter comprises a temperature associated with at least one component of the device, or a voltage generated by a thermocouple associated with the at least one device, and the plurality of other operating states comprises a spatial multiplexing power save (SM PS) mode state, a reduced channel bandwidth mode state, and an alternate modulation and coding scheme (MCS).

In another variant, the value of the first parameter comprises a value measured from at least one thermocouple within the device.

In a third variant, the threshold value comprises a value determined based on a plurality of different operating conditions for the portable wireless device.

In another variant, the steps of determining and switching are continued at least until the value no longer exceeds the threshold value, and the continued determining and switching comprises utilizing operating states which have progressively lower heat generation rates.

In a further variant, the switching comprises: first reducing at least one of a modulation and coding scheme complexity; next reducing the number of spatial streams used for communication; and then reducing at least one channel bandwidth.

In another variant, the switching comprises forcing the transceiver to enter an idle state via at least traffic shaping.

In yet another variant, the switching comprises a sequence of successive steps, the sequence substantially mitigating step-changes in the performance of the wireless transceiver that would otherwise occur if the sequence were not followed.

In a second aspect of the invention, a wireless device is disclosed. In one embodiment, the device comprises: a processing device coupled to at least one memory; a wireless transceiver for communicating with other wireless devices according to a specified wireless protocol; and a plurality of heat-producing components. The at least one memory comprises a plurality of instructions that when executed by the processing device: determine when the wireless transceiver and at least a portion of the plurality of heat generating components, when operating in their respective operating states, cause a thermal threshold value to be exceeded; and adjust one or more operating parameters for the wireless transceiver based at least in part on the determination.

In one variant, the plurality of instructions further comprises one or more instructions that when executed by the processing device, cause the adjustment of the one or more operating parameters until the thermal threshold value is no longer exceeded. The one or more operating parameters for the wireless transceiver are e.g., selected from the group consisting of: a spatial multiplexing power save (SM PS) parameter, a channel bandwidth parameter, and a modulation and coding scheme (MCS) parameter.

In another variant, the operating parameters are adjusted in a predetermined order, the predetermined order based at least in part on the degree of disruption of communications on the wireless transceiver caused by each the parameter adjustment. The predetermined order comprises for example first adjusting a spatial multiplexing parameter, or alternatively first adjusting at least one of modulation type and channel coding.

In yet another variant, the plurality of instructions further comprises one or more instructions that when executed by the processing device, determine whether a modulation and coding scheme (MCS) index exceeds a threshold index value. The plurality of instructions may further comprise one or more instructions that when executed by the processing device, reduces the MCS index when the threshold index value and the thermal threshold value are both exceeded, and/or one or more instructions that when executed by the processing device, adjust one or more of the operating parameters until: (i) the thermal threshold value is no longer exceeded and (ii) the MCS index is below the index threshold value.

In another variant, the operating parameters are adjusted in a predetermined order, the predetermined order based at least in part on a parameter relating to the level of disruption for communications on the wireless transceiver.

In a further variant, the operating parameters are adjusted in a predetermined order, the predetermined order comprising adjusting a channel bandwidth parameter after adjusting a spatial multiplexing parameter.

In still another variant, the processing device comprises a microcontroller, and the wireless transceiver comprises a transceiver compliant with (draft) IEEE Std. 802.11n.

In a third aspect of the invention, a method for providing thermal management in a wireless device is disclosed. In one embodiment, the method comprises: characterizing a plurality of adjustable operating parameters in terms of their disruption to a communications link when adjusted, the act of characterizing producing a listing ordered from least disruptive to most disruptive for the plurality of adjustable operating parameters; evaluating a thermally-related parameter of the wireless device; and when the thermally-related parameter exceeds a threshold, adjusting individual ones of the plurality of the operating parameters in the listing order so as to reduce the thermally-related parameter below the threshold.

In one variant, the thermally-related parameter comprises temperature, and the adjustable operating parameters relate to the operation of a wireless transceiver of the device. The adjustable operating parameters are selected e.g., from the group consisting of: (i) at least one of modulation and coding scheme; (ii) channel bandwidth; and (iii) spatial multiplexing.

In another variant, the temperature comprises the temperature within at least one portion of the wireless transceiver.

In a further variant, the characterizing a plurality of adjustable operating parameters in terms of their disruption to a communications link when adjusted comprises evaluating a plurality of state changes for the wireless transceiver, the state changes comprising: a state change from a multi-stream modulation to a single stream modulation; a state change from one combination of modulation type and code rate to another combination of modulation type and code rate; and a state change from a first channel bandwidth to a second channel bandwidth of lesser value.

In another embodiment, the wireless device has a wireless transceiver, and the method comprises: determining whether a thermal value of the wireless device, when operating in conjunction with the wireless transceiver, exceeds a threshold value; and adjusting one or more operating modes for the wireless transceiver by considering at least the determined thermal value and a current operating mode for the wireless transceiver.

In one variant, the wireless transceiver comprises an OFDM-based modulation scheme and multiple input, multiple output (MIMO) antenna functionality.

In another variant, the wireless transceiver comprises a transceiver compliant with IEEE Std. 802.11n, and the current operating mode comprises a modulation and coding scheme (MCS) index value which exceeds a predetermined index threshold value.

In yet another variant, the one or more of respective operating modes to be adjusted comprises the MCS index value, and the act of adjusting comprises repeating the acts of determining and adjusting until either the thermal threshold value is no longer exceeded, or the current MCS index no longer exceeds the index threshold value.

In a further variant, the adjusting one or more operating modes for the wireless transceiver by considering at least the determined thermal value and a current operating mode for the wireless transceiver comprises evaluating the proximity of the determined thermal value to the threshold value.

In a fourth aspect of the invention, a thermal management system for use in a portable device is disclosed. In one embodiment, the device comprises at least one wireless transceiver, and the system comprises: a controller; a plurality of environmental sensors in operative communication with the controller; and a storage device operatively coupled to the controller, the storage device comprising a computer program which, when executed by the controller, performs thermal management according to the method comprising: evaluating signals from one or more of the sensors in relation to one or more first criteria; and if the evaluating indicates that thermal management is required, causing the wireless transceiver to change states according to at least a first prescribed order until the thermal management is no longer required.

In one variant, the method further comprises selectively causing the wireless transceiver to change states according to at least a second prescribed order instead of the first prescribed order until the thermal management is no longer required.

In a second variant, the second prescribed order comprises a more aggressive thermal reduction sequence than that of the first prescribed order, and the evaluating comprises determining that the more aggressive sequence is required. The first prescribed order may be less disruptive to data communication over at least one channel of the wireless transceiver than the second prescribed order.

In another variant, the controller comprises a digital microcontroller; the storage device comprises a RAM, ROM or FLASH memory; the plurality of sensors comprises a plurality of thermocouples; and the wireless transceiver comprises an OFDM modulation scheme and a spatially diverse antenna system.

In a fifth aspect of the invention, a portable computerized device is disclosed. In one embodiment, the device comprises: a digital processor; a wireless transceiver having a power amplifier having a first state, the first state comprising a first power output, and one or more second states having respective power outputs that are each less than the first output; and a thermal management system in operative communication with the wireless transceiver. The thermal management system is adapted to operate the wireless transceiver: (i) within the first state for at least bursts; and (ii) within one or more of the second states when the thermal management system indicates that a thermal condition exists within the device that has exceeded a prescribed threshold.

In one variant, the power amplifier of the wireless transceiver is disposed within an enclosure of the device such that if operated in the first state continuously in conjunction with operation of the device, at least one component of the wireless device or transceiver would overheat.

In another variant, the first state comprises an output power of greater than approximately 22 dBm.

In yet another variant, the thermal management system operates the wireless transceiver within the one or more of the second states according to at least one prescribed hierarchy of operational modes. For example, the at least one prescribed hierarchy of operational modes comprises: a first hierarchy organized substantially based on disruptive effect on a communication channel of the transceiver; and a second hierarchy organized substantially based on accelerated reduction of temperature as compared to that of the first hierarchy.

In a sixth aspect of the invention, a portable computerized device is disclosed. In one embodiment, the device comprises: a digital processor; a wireless transceiver having a power amplifier and a plurality of operating states, each of the states having a different combination of output power from the amplifier and data rate over a wireless channel; and a thermal management system in operative communication with the wireless transceiver, the thermal management system adapted to operate the wireless transceiver in one of the plurality of states based on: (i) a control input, and (ii) obeying at least one thermal criteria of the device.

In one variant, the control input comprises a user input received via a user interface, the user input specifying at least the desired relative importance of range capability to data rate, and the user interface comprises an interface that permits the user to input the desired relative importance graphically.

In another variant, the control input comprises an input received from logic within the device that automatically determines a desired relationship between range capability and data rate.

In yet another variant, the thermal management system further comprises a plurality of hierarchies of operational modes, the plurality comprises: a first hierarchy organized substantially based on disruptive effect on a communication channel of the transceiver; and a second hierarchy organized substantially based on accelerated reduction of temperature as compared to that of the first hierarchy. One or more of the hierarchies are implemented by the thermal management system if the at least one thermal criterion is exceeded.

In a further variant, the thermal management system is further adapted to select a different one of the plurality of states if the at least one thermal criteria is exceeded, the different one of the states being selected so as to reduce heat generation within at least the power amplifier.

In a seventh aspect of the invention, a computer-readable apparatus is disclosed. In one embodiment, the apparatus comprises a storage medium adapted to store a plurality of computer program instructions which, when executed, provide thermal management of a portable device with a wireless transceiver by, inter alia, selectively invoking one or more hierarchical routines that successively reduce heat generation within the device by adjusting different parameters within the wireless transceiver.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 4 is a tabular representation illustrating a portion of the radio modes specified in by IEEE Std. 802.11n useful in implementing the methodologies of one embodiment of the present invention.

FIG. 4A is a tabular representation illustrating the prior art Modulation and Coding Schemes (MCS) radio modes specified in IEEE Std. 802.11n useful in implementing the methodologies of one embodiment of the present invention.

DETAILED DESCRIPTION OF THE INVENTION

Figure 1:
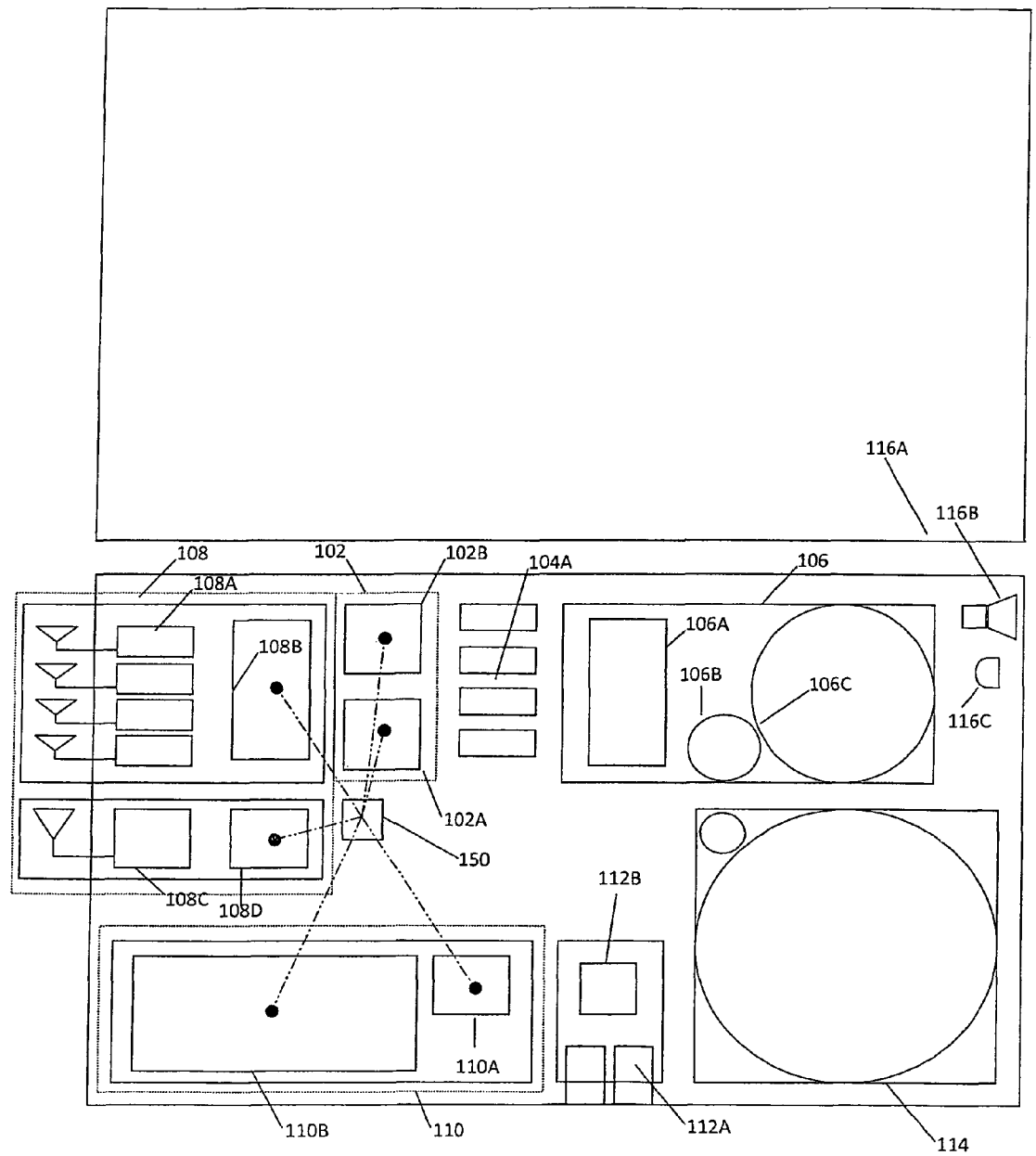
FIG. 1 is a functional block diagram illustrating one embodiment of a wireless client apparatus adapted to implement the thermal management and control methods of the present invention.

Reference is now made to the drawings, wherein like numerals refer to like parts throughout.

As used herein, the term "access point" or "AP" refers generally and without limitation to a network access point (e.g., such as a gateway or router) which allows access for one device to one or more other networks. For example, one type of access point might comprise an Ethernet router. Another type of access point might comprise an IEEE Std. 802.11 Wi-Fi™ "AP". These terms should in no way be construed as to be limiting to a particular network standard, protocol, or topology.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment.

As used herein, the term "Bluetooth" refers without limitation to any device, software, interface or technique that complies with one or more of the Bluetooth technical standards, including Bluetooth Core Specification Version 1.2, Version 2.0, and Version 2.1+ EDR.

As used herein, the term "circuitry" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, and ROM), digital processors, SoC devices, FPGAs, ASICs, ADCs, DACs, transceivers, memory controllers, and other devices, as well as any combinations thereof.

As used herein, the terms "client device", "end user device" and "UE" include, but are not limited to cellular telephones, smartphones (such as for example an iPhone™), personal computers (PCs), such as for example an iMac™, Mac Pro™, Mac Mini™ or MacBook™, and minicomputers, whether desktop, laptop, or otherwise, as well as mobile devices such as handheld computers, PDAs, video cameras, set-top boxes, personal media devices (PMDs), such as for example an iPod™, or any combinations of the foregoing.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "integrated circuit (IC)" refers to any type of device having any level of integration. (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, and ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "network" and "bearer network" refer generally to any type of data, telecommunications or other network including, without limitation, data networks (including MANs, PANs, WANs, LANs, WLANs, micronets, piconets, internets, and intranets), hybrid fiber coax (HFC) networks, satellite networks, cellular networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, 802.11, ATM, X.25, Frame Relay, 3GPP, 3GPP2, WAP, SIP, UDP, FTP, RTP/RTCP, H.323, etc.).

As used herein, the terms "network interface" or "interface" typically refer to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), Wi-Fi™ (e.g., 802.11a,b,g,n, or any draft standards relating thereto), WiMAX (802.16), PAN (802.15), IrDA or other wireless families.

As used herein, the term "wireless" means any wireless signal, data, communication, or other interface including without limitation Wi-Fi™ (IEEE Std. 802.11), Bluetooth, 3G (3GPP, 3GPP2, UMTS), HSDPA/HSUPA, TDMA, CDMA (e.g., IS-95A, WCDMA, etc.), FHSS, DSSS, GSM, PAN (IEEE Std. 802.15), WiMAX (IEEE Std. 802.16), MWBA (IEEE Std. 802.20), narrowband/FDMA, OFDM, PCS/DCS, analog cellular, CDPD, satellite systems, millimeter wave or microwave systems, acoustic, and infrared (i.e., IrDA).

As used herein, the terms "WLAN" and "wireless LAN" refer generally to any system wherein a wireless or air interface is employed between two devices, and which provides at least local area networking capability. Wi-Fi™ systems are one exemplary instance of WLANs.

Overview

In one aspect, the present invention discloses, inter alia, methods and apparatus that enable a wireless device to include thermal considerations in the choice of the radio performance state of the device. This feature allows, for example, the device to provide high data rate capabilities while still preventing damage to its components or adversely affecting user comfort or safety. Apparatus and methods are also disclosed for monitoring the thermal environment of one or more radios/modems within an equipment enclosure, and dynamically modifying their behavior to ensure that heat energy does not exceed a maximum prescribed threshold. In one regard, the invention also advantageously enables a broader range of equipment form factors and industrial designs implementations (within certain reasonable usage limitations).

In another aspect of the invention, methods and apparatus are disclosed wherein a client or mobile device may communicate with other clients/mobile devices, and/or access points (e.g., Wi-Fi™ APs) so as to cooperatively provide more options for thermal management. More specifically, while the WLAN has complete control of its own transmit radio operation; it requires cooperation from an external (transmitting) entity to optimize its receiver. The WLAN may request the transmitting party to throttle down its transmission rate, based on thermal conditions. Furthermore, when a WLAN client invokes Spatial Multiplexing Power Save (SM PS) mode and disables one or more of its receive chains, transmitting WLAN stations match their transmit chains to disable corresponding spatial streams.

In yet another aspect of the invention, usage of high-performance radios within very small industrial designs is disclosed. These high performance radios offer drastic improvements in coverage; by carefully controlling radio operation (e.g., spreading out periods of "hot" accesses with "cool down" periods according to a "bursty" transmission model), such radios can be used in small form-factor devices to achieve inter alia significantly higher ranges than such devices with prior art (non-high performance) radios.

Detailed Description of Exemplary Embodiments

Exemplary embodiments of the present invention are now described in detail. While these embodiments are primarily discussed in the context of a WLAN wireless network (e.g., IEEE Std. 802.11n "Wi-Fi™" implementation), it will be recognized by those of ordinary skill that the present invention is not so limited. In fact, the various aspects of the invention are useful in any wireless network that can benefit from the dynamic adjustment of operational modes between transceivers as is disclosed herein, such as for example those compliant with the 3GPP/3GPP2 initiatives and standards, or IEEE 802.16x (WiMAX) systems.

Moreover, while discussed primarily in the context of maintaining transceiver operation within certain desirable or tolerable thermal ranges by modifying transceiver parameters (e.g. Modulation and Coding Schemes (MCS), Spatial Streams, Spatial Multiplexing Power Save (SM PS), and Channel Bandwidth), it is recognized that other transceiver parameters may be controlled without departing from the principles of the present invention described herein. For instance, as discussed in greater detail below, so-called "regulatory band" may be controlled to effect a change in thermal performance of the transceiver.

Apparatus

Referring now to FIG. 1, an exemplary wireless client apparatus 100 useful in implementing the methods of the present invention is illustrated. While a specific device configuration and layout is shown and discussed, it is recognized that other implementations can be readily implemented by one of ordinary skill given the present disclosure.

In the illustrated embodiment, the apparatus 100 comprises a wireless client such as a portable (laptop or handheld) computer, or mobile communications device (e.g., cellular phone, 3G "UE" or smartphone) capable of dynamically monitoring its thermal environment, and modifying its radio/modem behavior. In one exemplary implementation, the monitoring functionality is performed within a dedicated processing device coupled to temperature monitoring devices distributed throughout or proximate to the equipment enclosure, as described in greater detail subsequently herein.

As shown in FIG. 1, the client apparatus 100 comprises a processing subsystem 102, other heat generating elements 104, heat dissipating elements 106, a radio/modem subsystem 108, and a power subsystem 110. Additionally, the client apparatus also comprises a temperature monitoring subsystem.

The processing subsystem 102 comprises a central processing unit (CPU) or digital processor 102A, such as a microprocessor, digital signal processor, field-programmable gate array, or plurality of processing components mounted on one or more substrates. The processing subsystem is tightly coupled to operational memory which may include for example SRAM, FLASH and SDRAM components. The processing subsystem may also comprise additional co-processors, such as a dedicated graphics accelerator, network processor (NP), or audio processor. As previously discussed, processing activity is directly related to heat generation; therefore, the processing subsystem is commonly located within reasonable proximity of a heat dissipating device 106 (e.g., heat sink) described hereafter.

Other heat-generating components 104 commonly found within the wireless client 100 may include: (i) a memory subsystem, (ii) peripheral media, and (iii) user IO. The memory subsystem may implement a bulk storage, non-volatile media such as a Hard Disk Drive (HDD). A typical HDD may additionally comprise a memory controller, a motor, and a magnetic media (i.e. platters). Additionally, one or a more of Direct Memory Access (DMA) type hardware may be included to offload large memory accesses from the processing subsystem. In certain media formats, such as Universal Serial Bus (USB) or IEEE Std. 802.3af type peripherals, power may be provided through the external port. A discrete USB or other such driver may be used to enable the specific requirements of the driver (e.g. differential logic levels, slave power requirements, etc.).

In other media, such as a Compact Disc (CD) and/or Digital Versatile/Video Disc (DVD) type device, power is used to drive a motor, memory controller, and read/write laser.

The user interface system comprises any number of well-known I/O including, without limitation: a keypad (not shown), touch screen (not shown), LCD or TFT display, backlights, LEDs, speaker, and microphone. The LCD or TFT display, and associated backlight or LEDs may have significant power requirements associated with them (and hence may generate appreciable heat).

The radio/modem subsystem 108 comprises at least one radio and modem assembly (e.g. WLAN interface). As shown, the radio/modem subsystem may have multiple antennas 108A (current Wi-Fi™ standards offer support for up to four antennas, such as those in a MIMO configuration). A modem subsystem 108B is typically implemented as a single modem ASIC. In many modem subsystems, the peripheral devices associated with radio transmission, such as a Power Amplifier (PA), and power management (such as a Low DropOut (LDO) Regulator), are also present (neither shown). Additionally, in the illustrated embodiment, additional or multiple radio/modem subsystems may coexist on the wireless client. For instance, a typical wireless handheld device (such as the exemplary iPhone™ device manufactured by the Assignee hereof) may possess a cellular interface (e.g., 3G UMTS and/or General Packet Radio Service (GPRS)), a WLAN (e.g., Wi-Fi™) interface, and a PAN (e.g., Bluetooth) interface. The additional radio/modem subsystem may comprise a separate antenna 108C, and modem 108D. In certain applications, the antennas and/or modem subsystems may be combined (such as dual/multi-mode radio systems).

The illustrated power management subsystem (PMS) 110 comprises a controller for battery management, and/or a plurality of discrete electrical components (not shown). Additionally, a chemical battery cell such as a Lithium Ion (Li-ion), or Nickel Cadmium (Ni—Cd) battery provides power to the client device. Due to chemical inefficiencies and internal resistance of the battery, the battery may dissipate energy as heat during operation. Heating of the battery, either through its operation or by other system components (such as the radio) may degrade battery performance.

One or more heat dissipation elements 106 or "cooling" elements may be used within the exemplary apparatus. The heat dissipating elements may comprise active cooling elements and/or passive cooling elements. Active cooling elements include, but are not limited to, cooling fans and liquid cooling elements. Passive cooling elements include, but are not limited to, heat sinks, heat pipes or conduits, and thermal dissipation packaging. In certain designs, the device enclosure provides the only heat dissipation (e.g., by conduction and/or radiation).

Lastly, the temperature monitoring subsystem comprises: a monitoring microcontroller 150 which is coupled to one or more thermocouples 152 or other temperature sensors (e.g., RTDs) which are distributed throughout the client chassis (or even exterior to the enclosure, such as on the exterior surface, or even on a peripheral that is in thermal communication with the host device). In the embodiment illustrated in FIG. 1, the thermocouples are distributed to locations within the chassis that generate comparatively large quantities of heat, such as the processor subsystem 102, the radio/modem subsystems 108, and the power management subsystem 110. While the exemplary embodiment measures thermal energy near the modem subsystem using thermocouples, other distributions, and methods of measuring temperature may be employed consistent with the invention. Furthermore, while a discrete microcontroller for monitoring temperature is utilized, other embodiments such as software or hardware implementations may be used as well.

Moreover, the thermal management functions of the microcontroller may even be integrated with the CPU or other dedicated processors within the design. As an example, thermal management functions may be implemented on an iMac™ computer using a dedicated System Management Controller (SMC); however, in an embedded design such as an iPhone™, there would not be space for a discrete microcontroller. Instead, an iPhone™ may implement these functions in the main application processor, either as an independent functional (hardware) block, or as a software routine executing within the operating system.

It will further be recognized that while client devices may have several internal heat sources during operation, the device may also be impacted by external heat sources. For instance, leaving the device lying in the sun (especially if its exterior enclosure is not particularly reflective to solar radiation) can elevate internal component temperatures significantly. Similarly, the mere act of the device being held tightly in a user's hand for a long period, or being placed close to the user's body (e.g., in a shirt pocket) can cause internal component temperatures to rise.

Moreover, in that the rate of heat dissipation from a source to a sink is directly related to the differential in temperature of the two objects, the ambient environment (i.e., temperature and relative humidity) in which the device is operating can make a very large difference in heat dissipation under the same operating conditions.

Despite the foregoing, which might otherwise present a complicated matrix of parameters and temperature sensors/measurements to completely characterize, some exemplary embodiments of the present invention account for these "external" heat sources passively. Specifically, by only monitoring certain heat-generating components within the device, the effects of the external heat sources on these components are indirectly considered. For instance, where the CPU of the apparatus 100 of FIG. 1 may operate at 120 degrees F. win a given operating mode when sitting in the shade, the same CPU might operate at 140 F in the same mode when the device is sitting in unabated mid-day sun. Hence, the thermal management system of the illustrated embodiment does not care how the CPU arrived at a given temperature, but rather simply takes actions to mitigate or manage deleterious temperatures once they are detected.

Part of the design criteria of the thermal management system for any given client device may also include "worst case" scenarios in terms of environmental influences, such that the management or heat removal capabilities of the system are not exceeded. For example, if the heat sinks of a given device were not sized or thermally coupled properly, certain components might become damaged under such "worst case" scenarios, even with thermal management employed, since the capacity for heat removal is exceeded by the heat input to the system. In such cases, a draconian but necessary step might include initiating a complete system shutdown (e.g., activation of a power-interruption circuit, etc.) so as to protect the components from permanent damage. This approach, however, has obvious detriments from a user experience (and even safety) standpoint; i.e., a user would likely become annoyed or frustrated if their cellular phone or laptop that was sitting in the sun would not operate until it was put in the shade for a period of time.

Wireless Networking

Figure 2A:
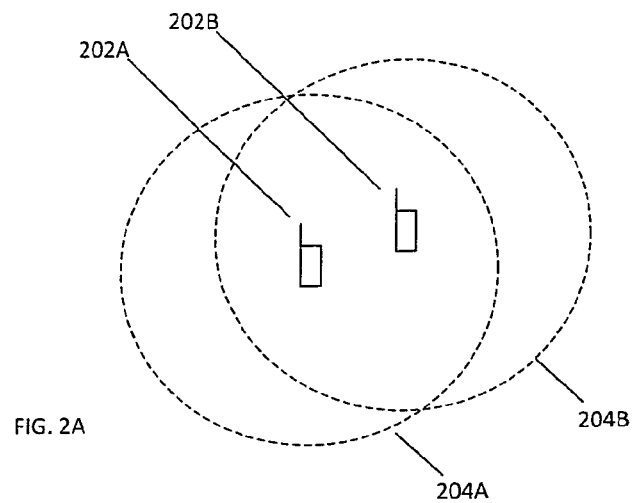
FIG. 2A is a functional block diagram of an exemplary prior art wireless ad hoc network.
Figure 2B:
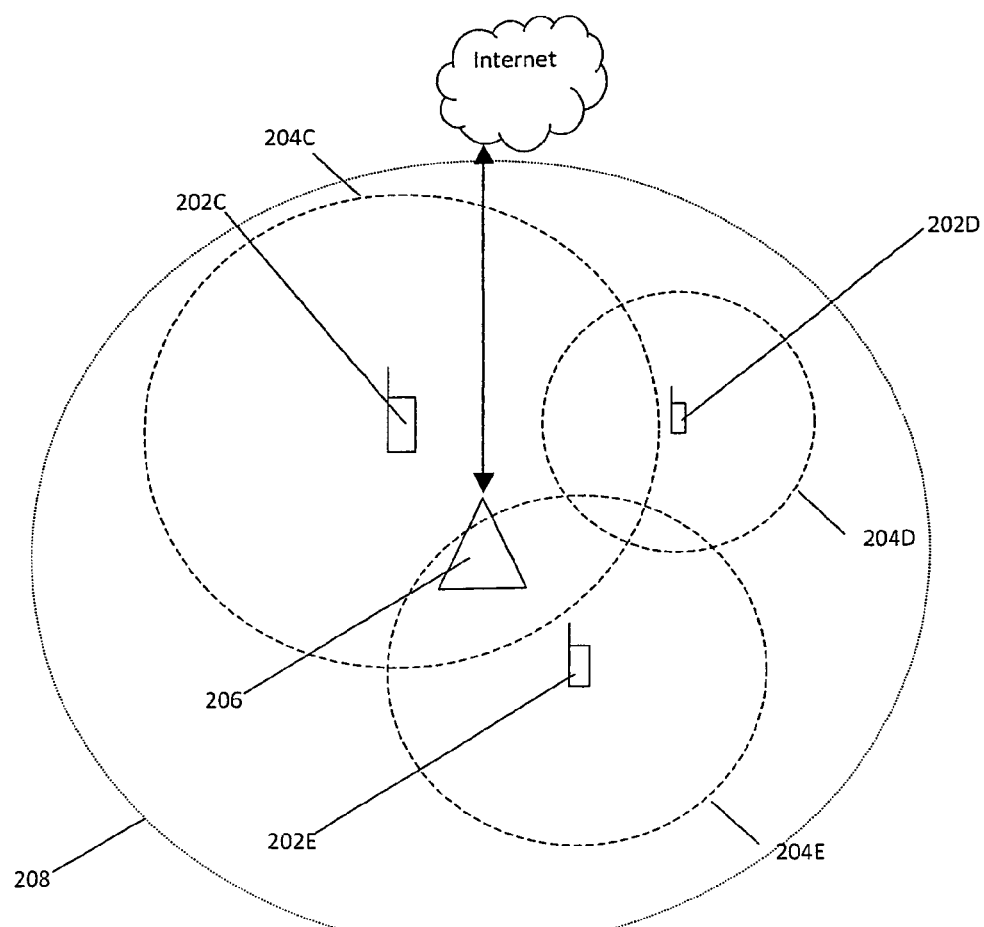
FIG. 2B is a functional block diagram of an exemplary prior art WLAN network utilizing a wireless access point (e.g., Wi-Fi™ AP).

As previously mentioned, the flexibility of wireless technology enables various network configurations. FIG. 2A illustrates one exemplary ad hoc wireless network connection directly between two wireless clients, 202A and 202B having coverage areas 204A and 204B respectively. Referring to FIG. 2B, the operation of a WLAN network having a WLAN access point (AP) is illustrated. Three clients 202C, 202D, and 202E having wireless coverage areas 204C, 204D, and 204E respectively, maintain a communications link with a AP 206, having a coverage area 208. As FIGS. 2A and 2B indicate, the nature of wireless client operation requires interoperability with a wide variety of intermediary or end points (e.g., other clients, APs, or distant servers such as for example a web server), as well as varying RF environments.

Due to the variable and often "free form" structure of wireless networks, implementing thermal/power control among clients is somewhat more challenging than the related problem on the CPU or GPU. A simplistic approach might measure radio power in each performance state, sort the results, and simply step down through that sequence as thermal conditions dictate. However, as FIGS. 2A & 2B illustrate, the modification of radio operation (unlike a processor which is a closed system) requires interaction with other clients, and may be significantly more disruptive to the communications link. A practical implementation must consider these effects in addition to power rates when choosing how to configure the radio(s).

Methods

Referring to the exemplary client apparatus 100 described above, a first embodiment of the generalized process 300 (FIG. 3) for dynamically adjusting radio operation according to thermal conditions present in the apparatus is now described.

At step 302 of the process 300, a "trigger" (e.g., a temperature which is outside the range of allowable temperatures for the client device enclosure or component) is detected. In an exemplary embodiment, the trigger is initiated by the monitoring microcontroller 150, after detecting an unacceptable temperature from one or more of the thermocouples. This initiation may comprise for example an electrical signal (e.g., change in voltage on an output pin of the microcontroller), or transmission of a formatted message to another entity within the device.

Alternatively, the "trigger" may not be a single temperature value exceeding a threshold, but rather two or more temperature values having a prescribed relationship to one another (or one or more thresholds). For instance, in one variant, only when two of three distinct sensors within the device exceed a certain value (for a prescribed period of time, so as to avoid transient conditions which to not genuinely warrant thermal management), will the subsequent steps of the process 300 be performed.

Yet other types and hierarchies of "trigger" criteria may be used consistent with the invention, such as a first or second derivative of temperature (e.g., temperature "acceleration" or rate of change, etc.). As can be appreciated, if the temperature of a component were allowed to change extremely rapidly, one or both of two deleterious conditions might result. First, design limits on the rate of change of temperature for that component might be exceeded (without ever exceeding a "maximum" temperature limit), thereby potentially damaging the component. Pouring boiling hot liquid into a freezing cold glass pitcher and causing it to crack is one everyday example of such a case—the pitcher could handle a much higher temperature in steady-state conditions, but the rate of change causes undue thermally-induced mechanical stress on the glass.

The aforementioned temperature and rate calculations may also be used to notify the user of potentially undesirable situations, such as the aforementioned impending battery failure. For example, such failing batteries may exhibit characteristic traits or artifacts with respect to temperature and rate of temperature change as they approach failure. If the device (FIG. 1) includes thermocouples or sensors for the battery/battery compartment, monitoring of these values over time may reflect one or more of the foregoing artifacts (e.g., "knee" in the temperature or rate-of-change curve) which could indicate impending failure; the microcontroller 150 could then signal the CPU or other infrastructure within the device to alert the user, and shutdown prior to any adverse affects, etc.

Second, the peak temperature at which the thermal management system might arrest the change may none-the-less exceed a maximum value for the component (i.e., if the temperature management system waits until a critical value of temperature is reached to initiate corrective action, it may not be able to arrest the overshoot in time to avoid component damage).

At step 304, the radio/modem subsystem determines its available operating modes given current operating conditions (see discussion of FIGS. 4 and 4A below for exemplary implementations of "modes" that may be available), and also determines the corresponding available data rates possible. In one variant, data rates are known a priori for the available operating modes.

At step 306, an operating mode is selected which will be implemented by the radio/modem subsystem. In one implementation, this selection is performed by the radio/modem subsystem itself. In another embodiment, the microcontroller 150 may make this choice. Yet other approaches are possible.

Optionally, at step 308, the radio/modem subsystem may signal its processing subsystem 102, other entities (e.g. WLAN clients 202, or a AP 206). Signaling to the processing subsystem may be necessary to facilitate transition between modes in some applications (e.g. streaming type applications). Signaling neighboring entities (e.g. WLAN clients and APs) may also be necessary for network coordination depending on the details of the specific implementation.

At step 310, the wireless client adjusts its operating mode. This adjustment may be performed contemporaneously or synchronously with all other affected parties (e.g. other wireless clients, and/or APs) so as to avoid discontinuities which may adversely affect user experience or performance.

Figure 3:
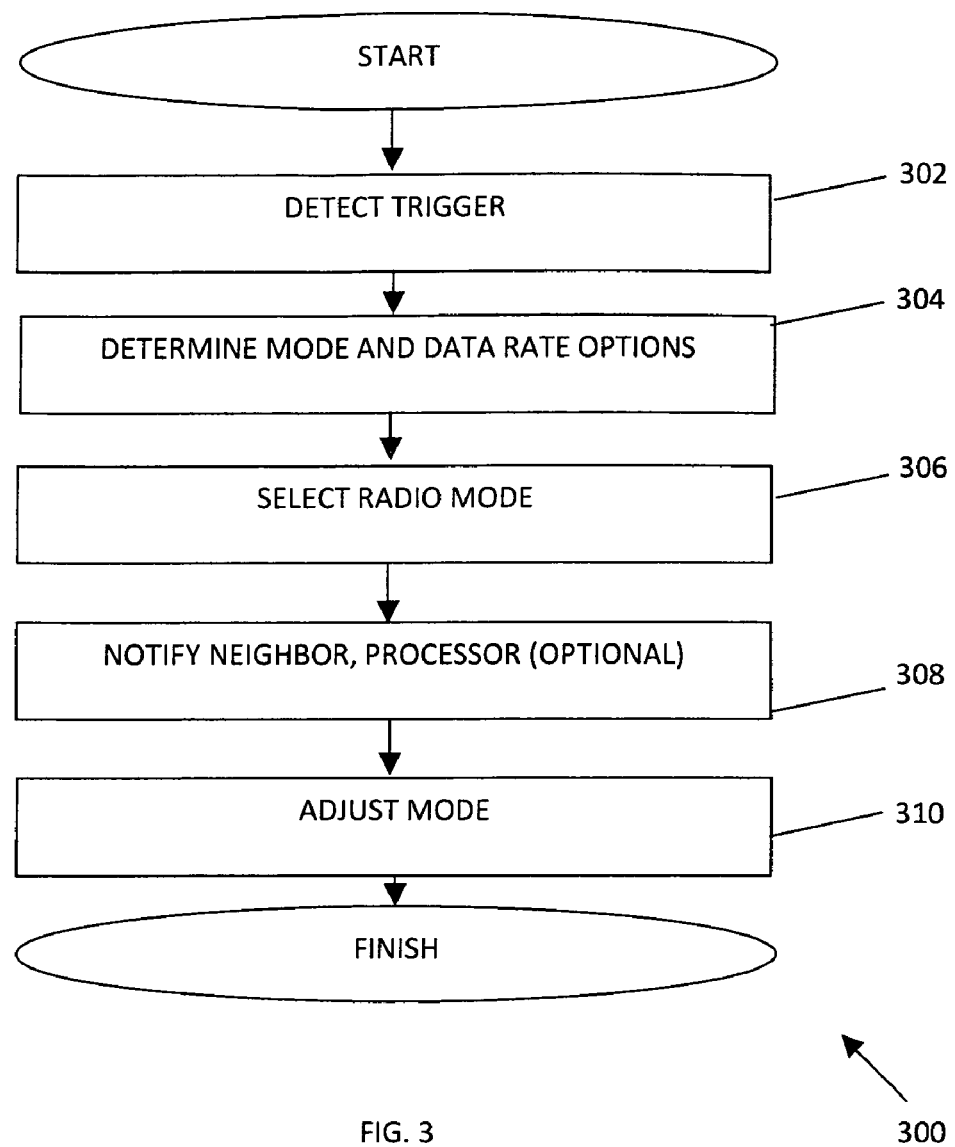
FIG. 3 is a logical flow diagram of an exemplary embodiment of the generalized dynamic thermal control process for changing radio modes in wireless transceivers in accordance with the invention.

It will also be appreciated that to the degree other air interfaces present within the enclosure are significant heat sources (e.g., a WiMAX interface, or to a much lesser degree a Bluetooth interface) or may provide some benefit in terms of thermal management, these interfaces may also be included within the logical flow described above, such as e.g., before or after the aforementioned methodology of FIG. 3 is employed.

Wireless-Specific Radio Operating Modes

Referring now to FIG. 4, one exemplary implementation of the foregoing method 300 in the context of a Wi-Fi™ (IEEE Std. 802.11) WLAN is described in detail for the purposes of illustration. As previously noted, the present invention may be readily adapted for any number of other wireless contexts including without limitation those of WiMAX (IEEE Std. 802.16), PAN (IEEE Std. 802.15), or even cellular systems.

Current implementations of radio specifications for Wi-Fi™ (i.e., IEEE Std. 802.11n, as documented in IEEE P802.11n™/D7.00, which is incorporated herein by reference in its entirety) are listed in FIG. 4. These specifications include the available radio parameters that may be adjusted; specifically: (i) Modulation and Coding Scheme (MCS), (ii) Number of Spatial Streams, (iii) Spatial Multiplexing Power Save Mode (SM PS), and (iv) Channel Bandwidth. Each of the foregoing radio parameters has varying effects on the radio/modem subsystem, both in terms of power consumption (caused by processing complexity, and/or antenna effects), and RF communication disruption (caused by changing the radio channel structure). It will be appreciated that while the following discussion is cast in terms of "modes" having two or more possible parameters that can vary, a "mode" according to the present invention may comprise a unique state or variation of as little as one parameter.

Digital modulation techniques map a physical radio transmission onto a "constellation" to determine a symbol which is translated into a digital signal. The various forms of digital modulation are named in reference to a constellation: Binary Phase Shift Keying (BPSK), Quadrature Phase Shift Keying (QPSK), 16 Quadrature Amplitude Modulation (16 QAM), 64 Quadrature Amplitude Modulation (64 QAM), and so forth. Corresponding to the complexity of the constellation, the transmitter and receiver must utilize more electrical power to correctly differentiate between symbols (i.e., a BPSK transceiver requires considerably less power for its two (2) symbols than a 64-QAM transceiver which utilizes sixty-four (64) possible symbols). Complex digital modulation schemes require significantly more power because more bits (and computational complexity) are required to process each corresponding received symbol (i.e., one bit is sufficient to represent a BPSK signal, two bits may represent a QPSK signal, etc.). Furthermore, modifications to digital modulation require synchronized cooperation between transceivers, to adjust radio channel characteristics accordingly.

Code (or coding) rate corresponds generally to the amount of transmitted bit redundancy. Code rate is represented as a fractional value corresponding to the number of bits decoded/coded from the number of bits received/sent. Typical code rates are 1/2, 3/4, 2/3, and 5/6, where a code rate of 1/2 would correspond to two bits sent for every one bit decoded. By increasing the code rate, additional processing complexity is required to receive/transmit the same amount of information (the tradeoff being ostensibly lower BER or bit error rate). Therefore, a 1/2 rate encoder must transmit 4 bits to convey 2 bits of information, whereas a 3/4 rate encoder will convey 3 bits of information after transmitting 4 bits. Furthermore, some lower coding rate decode operations require a greater number of decoder iterations. Code rate changes generally do not affect radio channel characteristics.

Multiple spatial streams are used to traverse different paths; when the streams are received at the receiver, they will have been time-shifted (different travel or path lengths), and have different characteristics (e.g. various constructive or destructive interference or fading effects such as Rayleigh fading, reflections, etc.). Path induced data corruption can be corrected by combining the streams together. Each additional spatial stream must be processed by a separate modulator/demodulator circuit, but can offer a directly proportional data rate gain (i.e., moving from one spatial stream to two spatial streams in theory can double the maximum data rate). Furthermore, antenna subsystems may have components which also contribute significant amounts of heat (such as power amplifier, analog to digital conversion, and gain circuits). Usage of multiple spatial streams has an appreciable impact on both power consumption and the radio channel.

Channel Bandwidth and Guard Interval (GI) modifications allocate additional physical resources for efficient usage. By doubling channel bandwidth, a gain of slightly better than double is achieved, as the guard frequency between the two 20 MHz bands is recycled or obviated. Channel bandwidth changes disrupt radio channel operation, as the transceivers must coordinate their antennas. Furthermore, channel bandwidth also affects data processing requirements, as bandwidth is directly related to data capacity (i.e. 40 MHz band has twice the theoretical data capacity that a 20 MHz band has). Changing the GI from 800 ns to 400 ns for example adds slightly more available time for transmission/reception, and minimally impacts power consumption and radio channel.

FIG. 4A details the supported MCS configurations in the current version of IEEE Std. 802.11n, previously incorporated herein. Each MCS specifies a digital modulation scheme, a code rate, and number of spatial streams. Furthermore, the data rate is additionally affected by the Channel Bandwidth, and Guard Interval (GI). Settings for MCS Index 0 through 7 of FIG. 4A are mirrored for MCS Index 8 through 15, MCS Index 16 through 23, and MCS Index 24 through 31, other than the spatial streams used. The MCS schemes provide multiple methods of attaining the same data rate. For instance, a data rate of 30 Mbps can be attained using either MCS 1 or MCS 8. A fifth parameter, regulatory band (e.g., 2.4 GHz or 5 GHz) also affects power, but switching channels or bands is often difficult to orchestrate. The present invention contemplates, however, that where high signal and user experience continuity is not required, changes in regulatory band may be employed as well.

It is also noted that if the offered load (i.e., that coming from higher protocol layers) is essentially unlimited over a time period or interval of interest, then reducing channel bandwidth reduces thermal power by, inter alia, reducing the rate at which waveform synthesizers and ADCs (analog-to-digital converters) operate. If the offered load is limited, say for example by a slow Internet link or by a natural limit of the traffic itself (e.g., a real-time video stream), then it can be the case that the lower bandwidth actually increases power. The intuition is that for a fixed amount of data, a faster transmission rate reduces the radio duty cycle, which may not always be the case. For instance, in the case of 802.11n, doubling the channel bandwidth halves the duty cycle, but only increases peak power roughly on the order of 10-25%. Hence, such complexity can also be modeled and utilized as part of the decision logic employed by the present invention.

The multiplicity of MCS schemes of FIG. 4A provides many options for modifying radio parameters to achieve varying effects on the radio/modem subsystem, both in terms of power consumption and level of RF communication disruption. This high level of "granularity" means that many possible optimization methods are also possible. In one example, a transmitting WLAN (e.g., Wi-Fi™ 802.11n) client operating in MCS 17 (3 spatial streams, QPSK, using 1/2 rate encoding) has a data rate of 90 Mbps. The WLAN client may opt to change to MCS 10 (2 spatial streams, QPSK, using 3/4 rate encoding), which would not impact the radio channel, and retain a 90 Mbps data rate. Alternatively, the WLAN client may opt to change to MCS 4 (single stream modulation, 16-QAM, 3/4 rate encoding), for more drastic power reduction. If the WLAN client can sustain a drop in its data rate, it may opt to choose MCS 16 (3 spatial streams, BPSK, using 1/2 rate encoding) with 45 Mbps.

The exemplary IEEE P802.11n/D7.00 specification also advantageously provides protocol mechanisms to gracefully change the parameters in FIG. 4. In the present context, the term "graceful" refers to changes which are not abrupt and/or which do not significantly impact user experience or channel continuity. Stated differently, a graceful change is one that is not readily perceived by the user.

It is noted that the Modulation and Coding Schemes (MCS) of FIG. 4A are indexed in order of PHY rate such that for MCS index i<32, the number of spatial streams is given by $_+i\div8_++1$, where $_+i\div8_+$ comprises a "floor" function of the type well known in the mathematical arts. For this reason, stepping down through the MCS indices (as happens during normal channel adaptation) includes stepping down through the number of spatial streams.

While MCS index controls what the radio transmits, Spatial Multiplexing Power Save (SM PS) mode dictates what the radio receives. SM PS informs the transmitting party (either Wi-Fi™ client or AP), that the receiver requires single stream modulation. By minimizing the additional receive antennas and decoder paths necessary to receive and demodulate signals, both radios (i.e., transmitter and receiver) are able to conserve power. This power saving mode has two sub-modes of operation: (i) static, and (ii) dynamic. While the 802.11n specification does not formally support a receiver-requested limitation to MCS (i.e., where the receiver sends a request to the transmitter to invoke a prescribed MCS scheme or state) other than possibly SM PS, which can to some degree be thought of as a special case request to use MCS<8), the present invention is not limited in this manner, and explicitly contemplates such a capability. Given the extant protocols for communication between wireless devices, such as those of the illustrated 802.11n-compliant variety, implementation of such a signaling mechanism between the receiver and transmitter may be readily implemented by those of ordinary skill provided the present disclosure.

In the static sub-mode of operation, the transmitting WLAN client is notified that the receiving client is operating in static single-radio mode. The transmitting WLAN client reduces its transmissions to a single spatial stream, until notified that it may reengage multiple stream radio operation.

The dynamic SM PS sub-mode also turns off all but one of the receiving client's radios. However, dynamic SM PS clients are enabled with a "wake up" feature, allowing them to rapidly enable additional radios when receiving frames that are addressed to them. The client can return to its "sleep" state by disabling its additional radios immediately after its frame reception is complete.

EXAMPLE NO. 1

The following example further illustrates one exemplary method of minimizing radio energy dissipation according to the present invention, in the context of one exemplary WLAN (e.g., Wi-Fi™ 802.11n) implementation of the wireless client.

Figure 5:
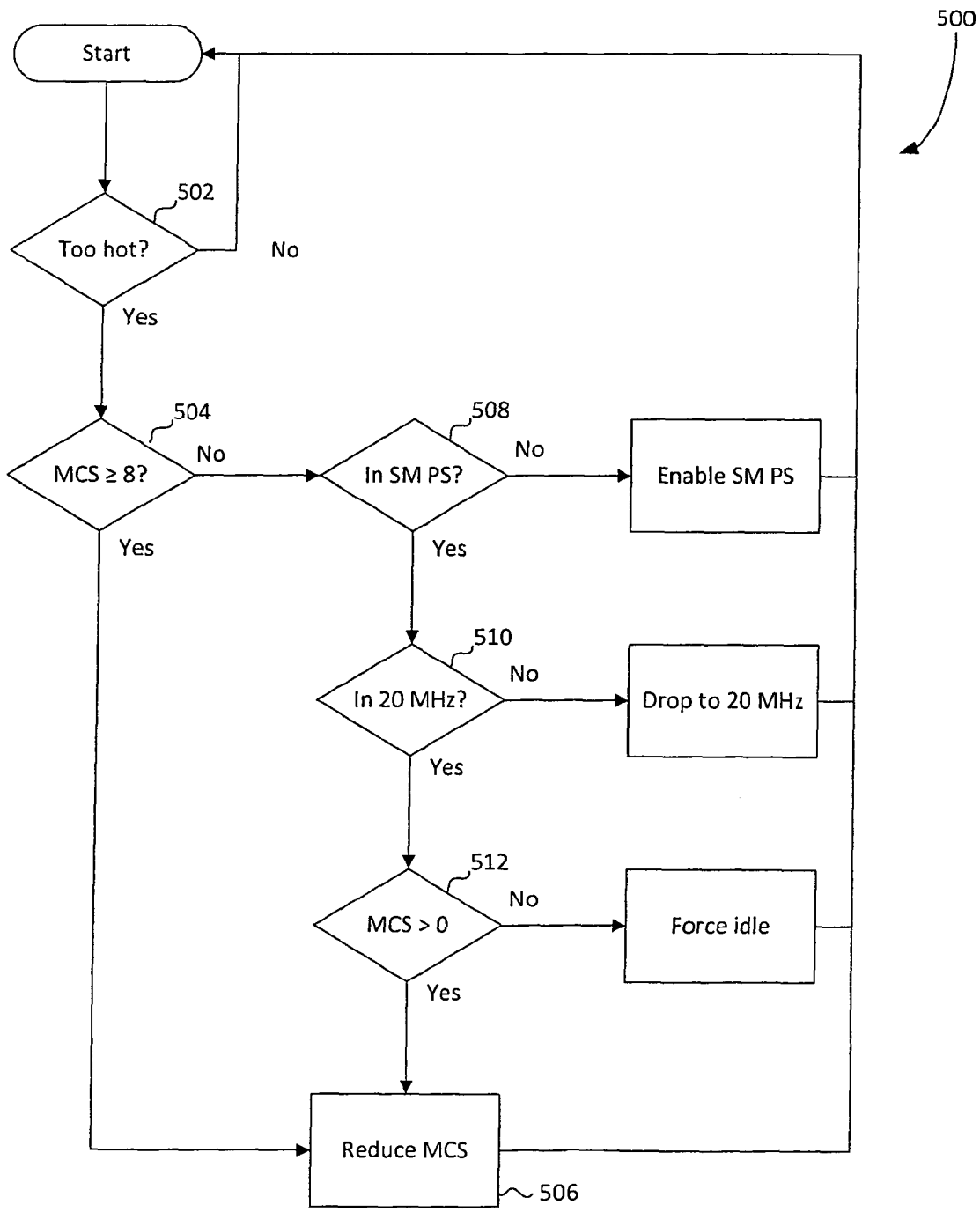
FIG. 5 is a logical flow diagram of one embodiment of the method for dynamic thermal control, optimized to minimize performance impact, in accordance with the invention.

FIG. 5 shows an algorithm which is adapted to preferentially take less disruptive steps first, beginning with the modifications to the standard physical layer (PHY) rate reductions that occur in typical RF channel adaptation. More specifically, the method 500 defers significant performance changes until switching to single-stream modulation.

At step 502, a microcontroller 150 polls or otherwise receives information relating to at least one sensor (e.g., thermocouple) 152 within the WLAN client used to monitor temperature. If the microcontroller determines that the enclosure (or a particular component) has exceeded the acceptable thermal operating range or other criteria (e.g., rate of change, as determined by a differentiation of temperature data over time), the microprocessor triggers responsive action at the WLAN modem 108B per step 504.

It will be appreciated that while a simple implementation of the foregoing takes temperature data from one thermocouple or sensor within the enclosure and controls radio or modem behavior based thereon, increasingly more sophisticated approaches can be sued as well. For instance, as referenced above, the rate of change of temperature for that sensor can be evaluated and used as a control metric. Moreover, when considering the rate of temperature change, the proximity of the temperature to its threshold may be germane; i.e., a rapidly increasing temperature when the component of concern is still relatively cool may warrant a different or less aggressive response than if the temperature of the component is approaching its maximum allowable value. See the discussion of Table 1 provided subsequently herein.

Additionally, multiple sensors can be used as the basis of control; such as where two or more values are examined and evaluated. This may also comprise an averaged value (weighted or otherwise). Similarly, a more device-holistic approach can be employed, wherein the data from multiple sensors is input to an algorithm which models the various contributions and thermal limits of different components, and derives one "aggregated" limit based thereon. For instance, a designer may know that when the weighted average of five (5) different sensors in a device exceeds a given value, this corresponds to an unacceptable condition in one or more particular components. The weightings for each different sensor may be determined theoretically, or even empirically; e.g., by building a prototype device and operating it under various conditions and determining the appropriate relationship or weight of each sensor to the averaging algorithm. Myriad other approaches may be used consistent with the invention.

At step 504, the WLAN modem 108B determines the Modulation and Coding Scheme (MCS), such as according to the MCS index scheme used in FIG. 4A. If the MCS is greater than or equal to 8, then the WLAN modem can proceed with standard PHY rate reductions which occur in typical RF channel adaptation. These PHY rate reductions are accomplished by reducing the MCS in step 506. Once the WLAN modem MCS has been reduced below 8, then the WLAN modem will be operating with only a single stream, and must therefore take further, more aggressive power management steps.

At step 508, the WLAN modem 108B initiates Spatial Multiplexing Power Save (SM PS) measures, which cause the transmitting party to drop its transmissions to single stream modulation (the link is then bi-directionally symmetric, as both receive and transmit streams are single-stream modulated). The exemplary Spatial Multiplexing power save (SM PS) mode is a to some degree a "communal" power control strategy; by entering SM PS mode, the receiver's power consumption is minimized by the transmitter's behavior. The transmitter changes to single stream modulation, allowing the receiver to also minimize its demodulation logic.

At step 510, the WLAN modem 108B then transitions from the 40 MHz channel bandwidth to 20 MHz. At this point, the link is operating at reduced (legacy) rates, but the radio should be generating considerably less energy.

If yet additional reductions are needed, the radio can continue to draw down the MCS index in step 512. As an extreme measure, traffic shaping policies could force the radio into the idle state according to a prescribed schedule. For instance, the thermal management system described herein might include an algorithm which allows for as "graceful" a transition as possible; i.e., one that does not arbitrarily truncate user operations in progress, which warns a user of the impending entry to idle mode, etc. Other "last ditch" measures might also be triggered by the microcontroller or modem before this graceful transition to idle state is entered, such as for example management or shutdown of components or systems outside of the radio/modem. For instance, other less critical systems such as backlighting or CD-ROM drives (if not in use for an existing operation) might be shutdown, or the CPU reduced in speed, in an attempt to mitigate the temperature rise at the component of interest.

Traffic shaping policies may also be useful in high performance designs, such as 60 GHz ("millimeter-wave") transceivers. Such high-performance designs may manage their operation to fit within the thermal capabilities envelope of a handheld device. For example, a 1.5 Gbps low-complexity transceiver may normally be considered usable within or matched to the normal constraints of a mobile phone. However, one may safely operate a 4 Gb/s OFDM transceiver design via a thermal duty cycle (e.g., implemented with traffic shaping), which would be equivalent to the 1.5 Gbps transceiver from a heating perspective.

With this method 500, it is likely that there will be a burst of MCS reductions at the outset, which could interfere with the normal channel adaptation performed by the radio. Therefore, this algorithm is generally not the most desirable for noisy or rapidly changing RF environments. However, this procedure advantageously avoids "step functions" in the link rate initially, which may be entirely reasonable when channel conditions are stable. Furthermore, this method does not require any additional hardware modifications, nor does it require significant software modification, as the process utilizes steps that the radio typically uses for negotiating RF channel adaptation anyway.

EXAMPLE NO. 2

Figure 6:
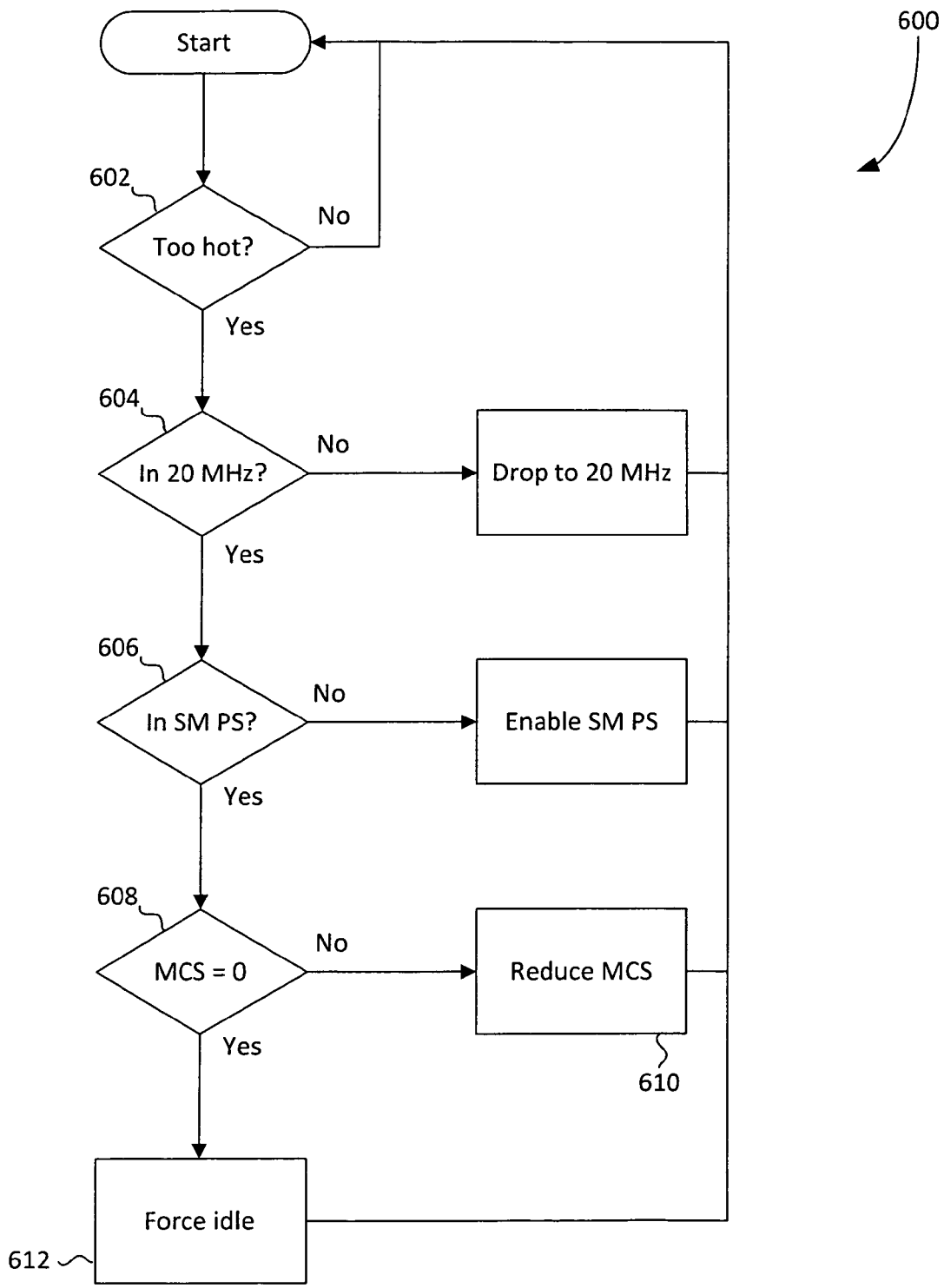
FIG. 6 is a logical flow diagram of a second embodiment of the method for dynamic thermal control, optimized to minimize radio impact, in accordance with the invention.

FIG. 6 shows an alternate methodology 600, which takes more aggressive thermal response measures at an earlier stage.

At step 602 a microcontroller 150 receives information from one or more sensors 152 within the WLAN client to monitor temperature, as previously described with respect to FIG. 5.

Step 604 of the method 600 aggressively reduces the channel bandwidth. This will halve the PHY rate, but will also remove a substantial amount of power (e.g. reduced transmit power, and signal processing) early on. If this step is sufficient, the radio only needs to adapt to the new (narrower) channel once; rather than multiple attempts at reducing the MCS.

If additional thermal relief is required, step 606 forces other devices to transmit single-stream signals, which can remove significant power from the receiver(s) and decode logic. (This step does not necessarily constrain the choice of transmit rates.)

As a last resort, in steps 608 and 610 the radio steps down through it's transmit MCS indices. If the MCS is at the minimum bit rate MCS 0, then the modem must use traffic shaping to insert idle states at step 612.

It will be recognized that the more aggressive reduction profile afforded by the method 600 of FIG. 6 (as compared to that of FIG. 5) may be selectively employed by the microcontroller 150 or other decision-making entity within the thermal management system based on temperature rate calculations (and proximity of current temperature to extant temperature limits or thresholds) of the type previously described. For instance, in one variant, the choice between implementing the less aggressive profile of FIG. 5, or that of FIG. 6, is based on the rate of temperature increase along with the actual current temperature sensed (for one or more sensors of interest). Hence, where the temperature measured by a given sensor is at or above the designated threshold level, and the rate of increase is above a second prescribed threshold, the more aggressive profile of FIG. 6 is invoked. Conversely, where only the temperature threshold (and not that for rate of change) is met, the process of FIG. 5 is invoked. Where the rate threshold is met, but not the temperature threshold, either (i) no action is instituted (depending on the proximity of temperature to the threshold), or (ii) the less aggressive process of FIG. 5 is employed so as to provide for a progressive mitigation of temperature. Where neither threshold is met, no action is taken. This logic is graphically illustrated in Table 1 below.

TABLE 1

| Temperature | Proximity of Temperature to Threshold | Rate of Change of Temperature | Thermal Management Profile | Remarks |
|---|---|---|---|---|
| <Threshold | <Threshold (−) | <Threshold | None | System "stable"; temp. may be increasing or decreasing |
| <Threshold | <Threshold (−) | >Threshold | None | System unstable, but not yet approaching critical temperature for component |
| <Threshold | >Threshold (−) | >Threshold | FIG. 5 | System unstable, and approaching critical temperature for component |
| >Threshold | <Threshold (+) | <Threshold | FIG. 5 | System unstable and slightly above temp. limit, but only slowly increasing |
| >Threshold | <Threshold (+) | >Threshold | FIG. 6 | System unstable, slightly above temp. limit, and rapidly increasing |
| >Threshold | >Threshold (+) | >Threshold | FIG. 6; "graceful" shutdown or idle if req'd. | System unstable, well above temp. limit, and rapidly increasing |

Note:
(−) indicates a proximity limit below the designated temperature limit of interest
(+) indicates a proximity limit above the designated temperature limit of interest

EXAMPLE NO. 3

In yet another example, the thermal management logic is implemented "blindly" or based on a priori knowledge of the temperature for given operating states, as opposed to actual sensor data. For instance, in one such variant, a fully instrumented prototype device that is otherwise completely representative of the actual production model(s) is subjected to a range of different operating and environmental conditions, and the resulting component temperatures of interest recorded. Such operational conditions might include, for example, (i) each of the foregoing MCS, channel bandwidth, spatial stream, and SM PS modes of FIG. 4A; (ii) battery charging or not charging (e.g., off an external AC adapter), (iii) direct sunlight exposure versus no sunlight exposure; (iv) different ambient temperature and humidity combinations); (v) peripherals (e.g., CD-ROM drive, USB ports, etc. in use or not); and (vi) display and backlighting options such as minimal brightness versus maximum brightness, etc. Time may also be a critical attribute in this approach; i.e., not only whether component X is operating or not, but also how long it has been operating (i.e., is it "warmed up" yet).

A detailed matrix of all of the foregoing permutations can be developed, and "curves" or plots developed. These relationships can then be programmed into hardware or firmware logic, or the algorithms running on the microcontroller 150, stored as tables, etc., such that the microcontroller 150 has a detailed representation of device performance as a function of the different variables. Those which otherwise require measurement (e.g., ambient temperature, humidity, solar exposure level, etc.) can be assumed to be "worst case" values for conservatism, and the remaining parameters determined through signaling or other such indications already resident within the device. For example, time indices can be readily gleaned from system or component clocks (such as that of the CPU, microcontroller, etc.), and information as to whether a CD-ROM drive, USB port, display, etc. are in use can be readily obtained from the existing infrastructure of the device (such as inter-process messaging, signaling on various pins, extant logic signals, etc.), and used as entry points or inputs to the aforementioned data tables or logic. In this fashion, a worst-case or "bounding" value is presumed, and thermal management algorithms (such as those of FIG. 5 or 6) implemented based on these models.

This approach has the advantage of not requiring any active or installed temperature sensors and associated infrastructure, but has the disadvantage of only being as good as its modeling which, depending on how the various assumptions are chosen, may diverge substantially from actual conditions within the device. For illustration of this point, consider the case where all assumptions regarding environment, operating components, etc. are made very conservatively—in such a case, significant restrictions on the radio/modem might be imposed unnecessarily, since the microcontroller 150 "thinks" that the device components are much hotter than they actually are. Hence, stated differently, the models must be conservative yet realistic in their assumptions, lest the user experience relating to the air interface (radio/modem), and/or that of the device as a whole, will be degraded.

EXAMPLE NO. 4

Figure 7A:
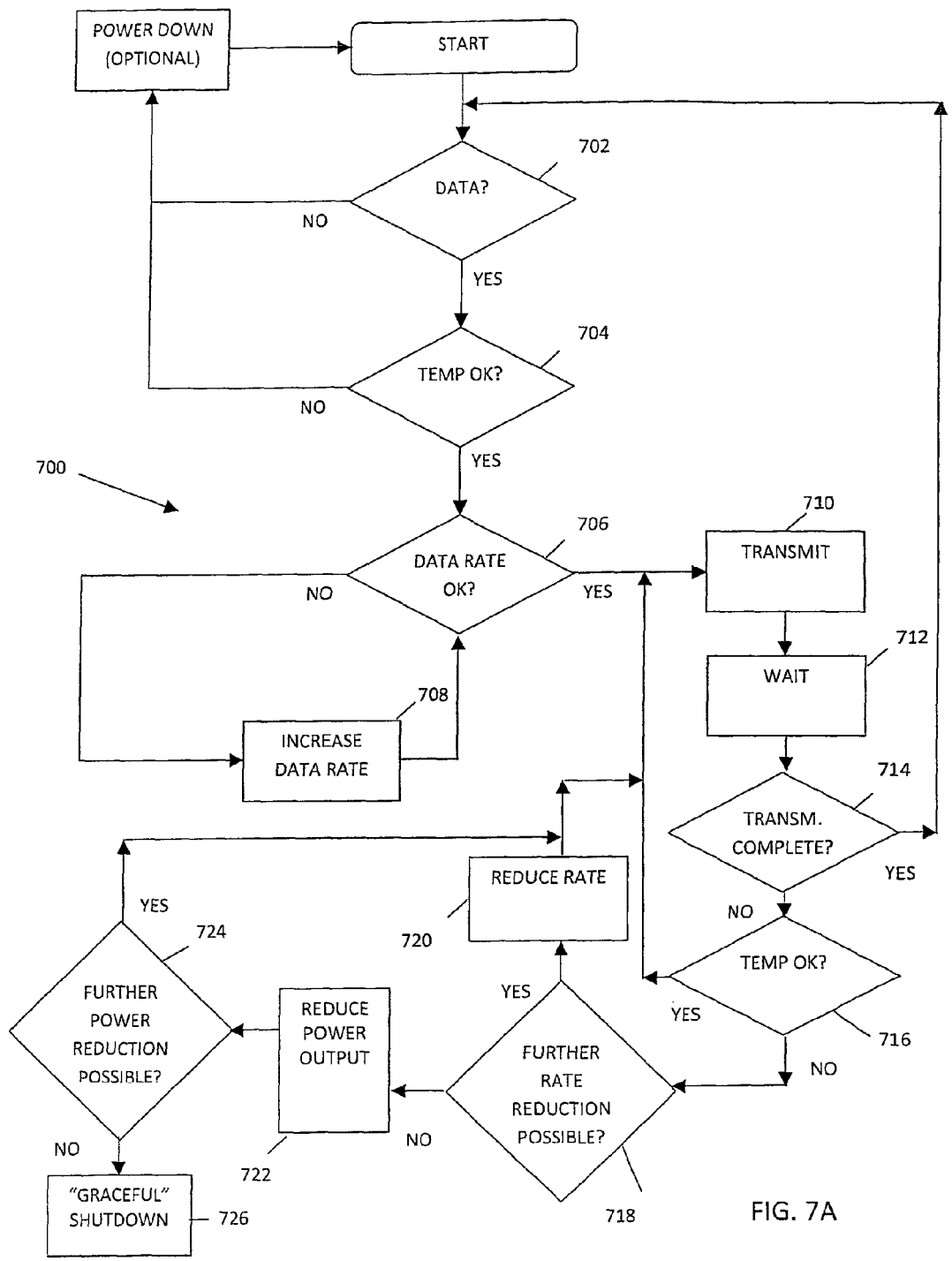
FIG. 7A is a logical flow diagram of another embodiment of the method for dynamic thermal control of the invention, optimized to maximize transmission power (corresponding generally to range) while remaining within acceptable thermal ranges.
Figure 7B:
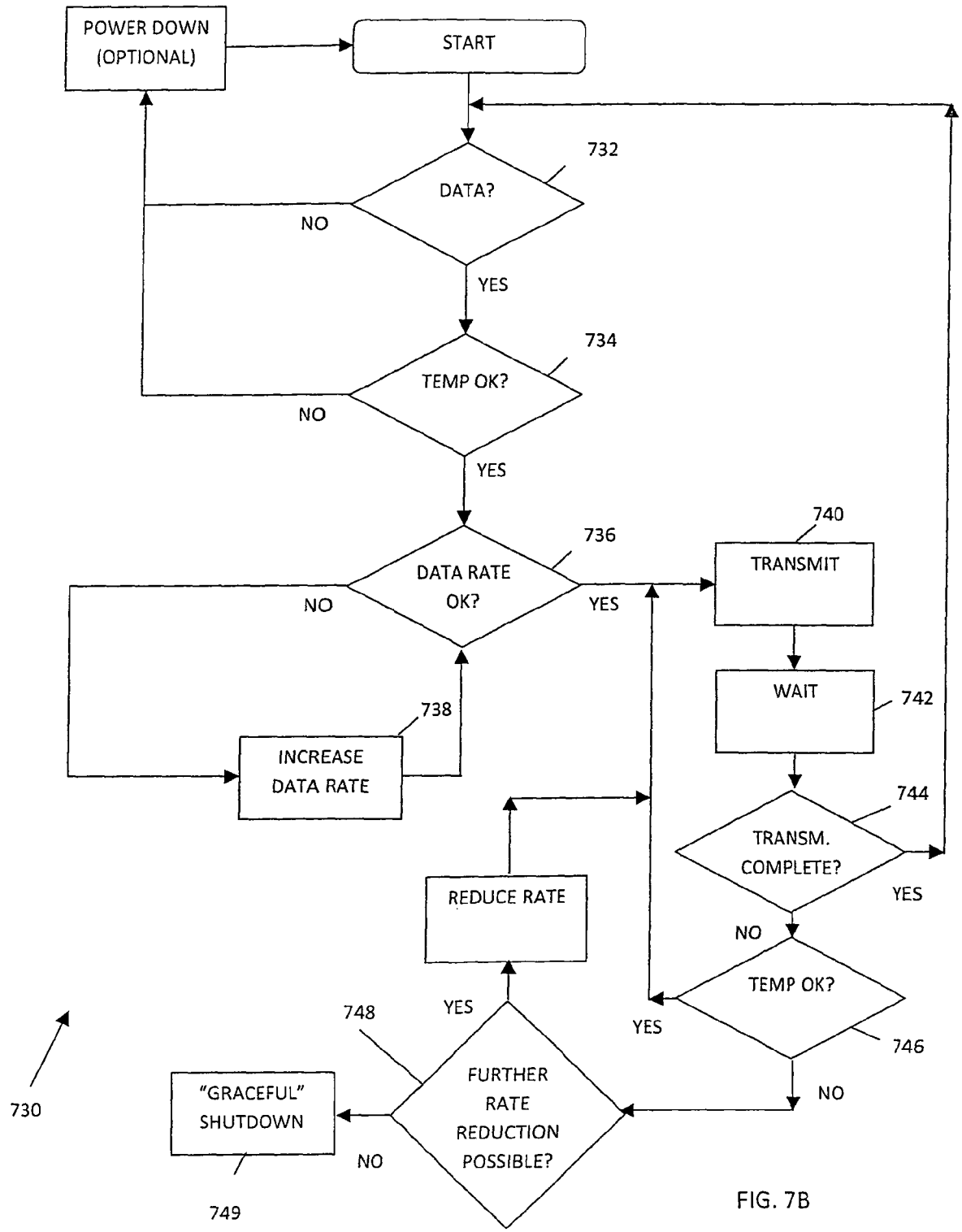
FIG. 7B is a logical flow diagram of yet another embodiment of the method for dynamic thermal control of the invention, optimized to maximize data transmission rate while remaining within acceptable thermal ranges, in accordance with the invention.
Figure 7C:
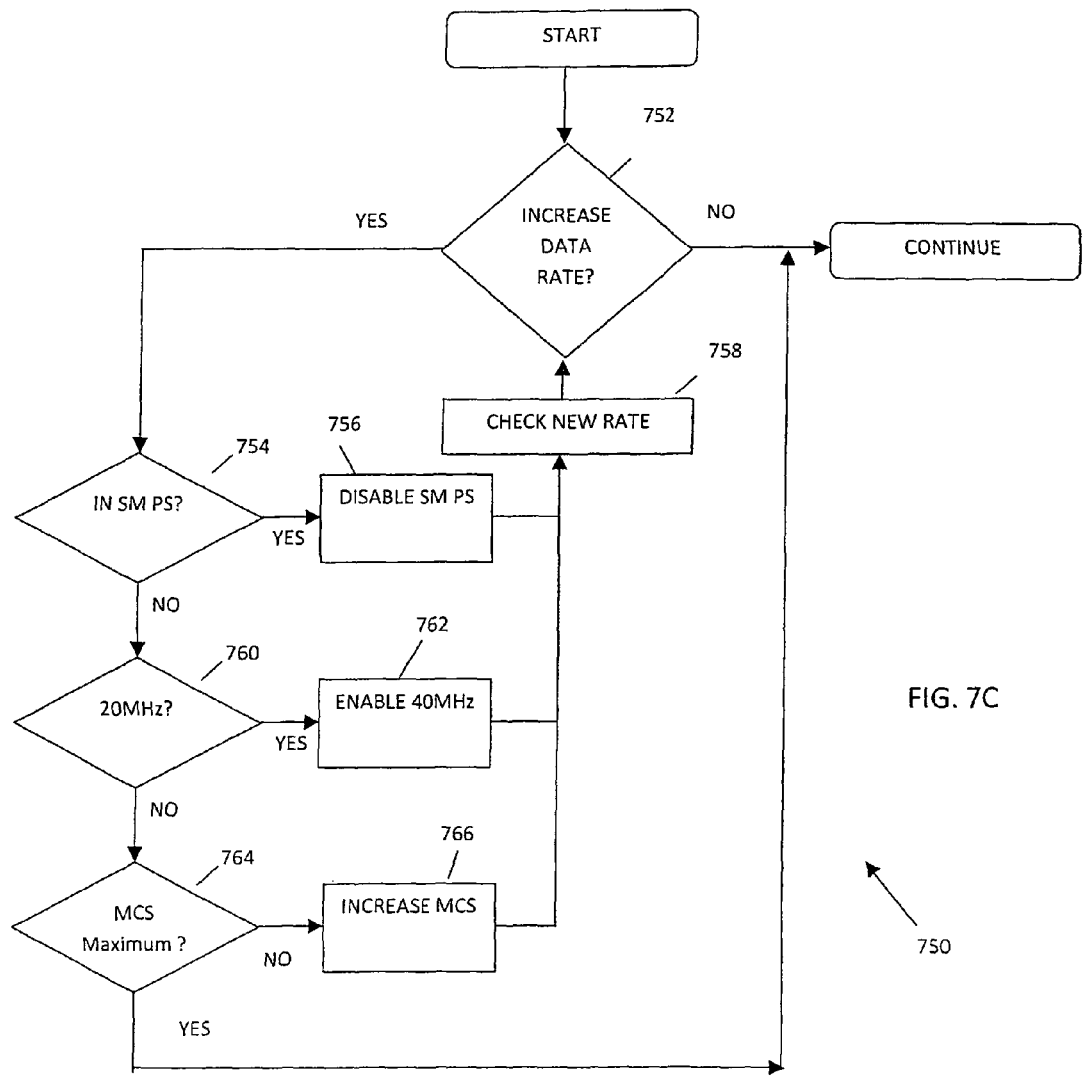
FIG. 7C is a logical flow diagram of one embodiment of the method for increasing data rate within a wireless transceiver once thermal management to reduce temperature has been imposed.

Referring now to FIGS. 7A-7C, various exemplary methods for transmitting data while obeying temperature limitations are described. These methods are particularly useful for inter alia, implementation of high-performance radios within aggressively small industrial designs. For example, radios with certain transmit power amplifiers (e.g., having output power in the 23-24 dBm range) are typically considered too "hot" for use in certain types of platforms, such as laptops or handheld devices. One example of such a high-powered transceiver is the model EMP-8602 manufactured by EnGenius Technologies Incorporated, having capabilities for 802.11 a/b/g, and transmit power capabilities up to 26 dBm. The high transmit power capabilities of such a device could offer enhanced range in a portable form factor, where the thermal output is managed sufficiently.

These high-performance radios offer great improvements in area coverage/data rate over lower power/rate alternatives, but due to limitations in heat dissipation capability imposed by the small form factor of their parent device and limited active cooling capability, must be carefully controlled. Such control may include "bursty" or modulated schedule models where high-power/high-speed data transmission is interspersed with periods of reduced or no activity ("cool down"). Using the methods of the present invention, such high-output devices may advantageously be deployed in these smaller portable or hand-held devices.

The method of FIG. 7A shows a first variant of the method of employing such high-performance radio or amplifier, with the "high performance" here correlating to high transmit power (and hence greater area coverage). As can be appreciated, there are often circumstances where greater coverage or range of the signal is needed, even at the expense of data rate. Stated differently, a high data rate is useless unless the signal can also be received and utilized by another (distant) station. However, there is also a practical minimum limitation on data rate; at some point, the transmission will be exceedingly long, rendering the device (even with greater range) functionally useless for this purpose to a user. Hence, the methodology of FIG. 7A attempts to optimize coverage area/range, with data rate being a secondary consideration. Since both increased range (transmit power) and data rate (computation or processing complexity/overhead) will result in a higher heat generation rate in the radio/modem components, the exemplary embodiment of FIG. 7A maintains transmit power maximized until a floor or threshold value of data rate is reached, at which time transmit power is reduced.

At step 702 of the exemplary method 700, the microcontroller 150 or high-performance radio itself determines if there is data to be sent. During periods of inactivity, the modem can be optionally wholly or partly powered down to additionally minimize radio usage and heat generation.

At step 704, a microcontroller 150 receives information (e.g., polls) at least one thermocouple 152 within the client so as to monitor initial temperature (and/or rate of change). If the radio/modem exceeds the acceptable thermal limit or rate, it may then wait for a prescribed period of time, or optionally power itself down, until the temperature is within acceptable ranges, before subsequent transmission is permitted.

At step 706, the microcontroller 150 sets the initial transmit power to its maximum value. The data rate is then selected (which may simply comprise the maximum available rate, which in the case of short, bursty transmissions, may be acceptable from a heat generation perspective). This selection of data rate may also be based for example on a priori knowledge of heat generation rates, or on actual temperature data from the sensor(s). Stated simply, if the radio/modem is comparatively "cool" to begin with, transmission at higher data rate (for the same assumed maximum transmit power) can be supported than if the radio/modem or other critical component starts out comparatively "hot".

At step 710, transmission is commenced. After a waiting period (step 712), the status of the transmission is determined (step 714). If complete (i.e., the transmission was very short), the process returns to step 702. If not complete, then temperature/rate of the one or more critical components is monitored (step 716), and if the temperature/rate is not acceptable, it is next determined if a data rate reduction is possible per step 718. If so, the data rate is reduced to mitigate heat generation per step 720. The process then returns to step 710 where transmission is continued, and after another waiting period, status is again determined (step 714) and temperature/rate again monitored (step 716). If temperature/rate is still too high, then additional rate reductions are imposed. This process continues until either the transmission is completed, or there are no further rate reductions available. At this latter point, the process then begins reducing transmit power of the amplifier (per step 722). If more power reductions are available (step 724), then a similar wait period and transmission status check are performed (steps 712 and 714), and then temperature evaluated again per step 716. This process continues until the transmission is completed, or no further power reductions are possible, in which case a "graceful" shutdown is performed per step 726.

Referring now to FIG. 7B, a method 730 is shown wherein a high-performance radio is used, and data rate and temperature are traded off with one another (i.e., the data rate is kept as high as possible subject to temperature limitations). Transmit power is assumed to be held at a constant value.

At step 732 of the exemplary method 730, the microcontroller 150 or high-performance radio itself determines if there is data to be sent. During periods of inactivity, the modem can be optionally wholly or partly powered down to additionally minimize radio usage and heat generation.

At step 734, a microcontroller 150 receives information (e.g., polls) at least one thermocouple 152 within the client so as to monitor initial temperature (and/or rate of change). If the radio/modem exceeds the acceptable thermal limit or rate, it may then wait for a prescribed period of time, or optionally power itself down, until the temperature is within acceptable ranges, before selection of a data rate and subsequent transmission is permitted.

At step 736, the modem evaluates the existing data rate (if any) as compared to an "optimal" data rate, or alternatively selects a rate for initial use. In one exemplary embodiment, this optimal rate comprises the most aggressive or highest data rate possible for transmission. If the data rate is acceptable (i.e., within a prescribed increment or value of the optimal rate), the modem begins transmission at step 740. If the data rate is not acceptable, then the modem modifies its radio operation per step 738 (such as by increasing channel bandwidth, altering MCS, etc.) until it has an acceptable data rate. More drastic methods of increasing data rate may require cooperation with external devices.

At step 744, the status of the data transmission is checked after a waiting period (step 742). If the transmission is complete, the process routes to step 732. If not complete, the temperature of one or more sensors is checked per step 746 (these may be the same, or different sensors than those checked in step 734). If the measured temperature/rate is still acceptable, transmission is continued per step 740. If the temperature/rate is not acceptable at step 746, the process next determines whether additional reductions in rate are available (step 748), such reductions corresponding to reduced heat generation. If additional reductions are available, the process next reduces the data rate (such as via any of the aforementioned parameters or modes), and continues transmission per step 740. If no additional reductions are available, the process implements a "graceful" shutdown per step 749. In this fashion, the process allows for reductions of rate (and hence reduced heat generation) where "bursty" high-speed communications continue on long enough to cause appreciable heat generation in the monitored component(s).

While not shown in FIGS. 7A or 7B, it will be appreciated that these processes 700, 730 may also include logic to ramp power and/or data rate back up in the event that the mitigation reductions are effective (before transmission is completed). Where applicable, such increases may be in mirror image to those on the reduction side (i.e., power is the last to be ramped down and first to be ramped up), or in asymmetric fashion (i.e., power is the last to be ramped down, but also last to be ramped back up).

For example, FIG. 7C shows one embodiment of a method 750 for increasing data rate (such as may be used in the context of FIGS. 7A or 7B). When an increase in data rate is called for (step 752), at first the WLAN modem checks if it is in spatial multiplexing power save (SM PS) mode per step 754. If so, the modem disables SM PS (step 756), and checks its new data rate per step 758. If not acceptable or additional increases are required, the frequency bandwidth is next checked per step 760. If operating within 20 MHz legacy channel bandwidth, then the modem enables 40 MHz channel bandwidth per step 762. Again, the new rate is checked per step 758, and if further increases are required, the WLAN modem checks its MCS per step 764, and increase its MCS (for a given modulation type) per step 766 until it has attained the desired data rate. This may also include changing modulation type (see e.g., FIG. 4A, wherein the maximum data rate for a certain modulation type may be less than for a different type, even with the same number of spatial streams).

It will be appreciated that other permutations of the steps of FIG. 7C may also be used, such as where channel bandwidth is examined before SM PS mode, etc. Moreover, numerous variants with the steps of varying MCS parameters may be used; e.g., one parameter varied first, another parameter varied second, and so forth. Myriad different combinations of the foregoing methods of the present invention will be recognized by those of ordinary skill given the present disclosure.

Figure 8A:
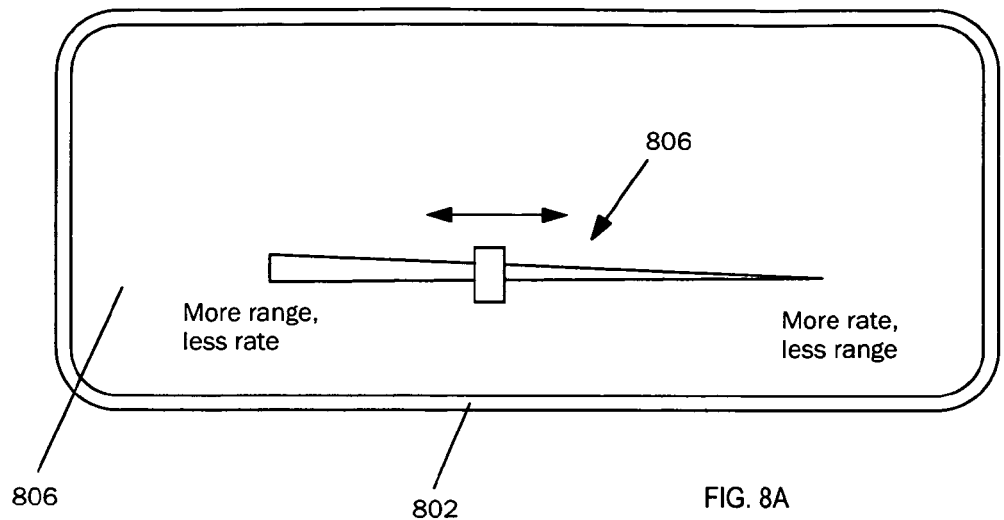
FIG. 8A is a elevation view of an exemplary wireless portable device equipped with one embodiment a graphical user interface permitting user control of the power (range)/data rate tradeoff, according to the invention.

The high-performance radio power/data rate tradeoff illustrated generally in FIG. 7A may also be controlled by a user, such as via a GUI slider 806 or other such mechanism disposed on the display 804 of the user device 802 (see FIG. 8A); e.g., one end of the slider comprising maximum range with minimum data rate (while obeying thermal limitations), and the other end comprising maximum data rate and minimal range.

Figure 8B:
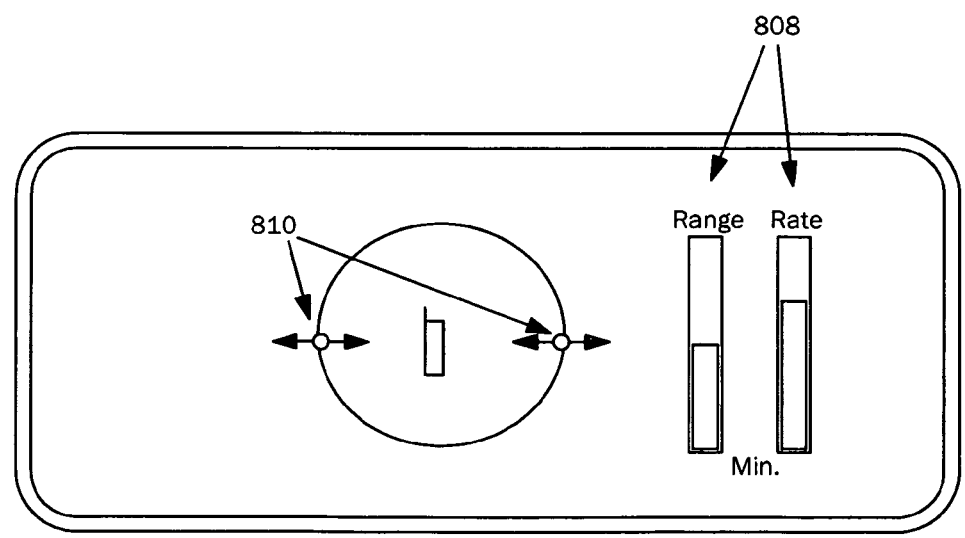
FIG. 8B is a elevation view of the wireless portable device of FIG. 8A, showing another embodiment a graphical user interface permitting user control of the power (range)/data rate tradeoff, wherein a "multi-touch" touch screen display is employed.

Alternatively, as shown in FIG. 8B, a graphical display of WLAN range can be used which leverages "multi-touch" user interface capabilities, such as those on the exemplary iPhone™ product manufactured by the Assignee hereof. Specifically, such multi-touch capability allows a user to utilize two (or more) fingers to contact the display, and create interactivity with the display at each point, versus just one as in conventional touch screen interfaces. As shown in FIG. 8B, the two touch points 810 might comprise the periphery of a circle (indicative of range); the user merely opens or closes the distance between their two fingers to increase or decrease WLAN range (at the expense of data rate or some other parameter), and the tradeoff is shown by the bar graph indicators 808 disposed on the display 804 as well so that the user knows when they are maximum/minimum for the value(s) of interest.

These user interfaces in effect allow for user-based software control over the priority of reduction used by the process of FIG. 7A (i.e., swapping the "power is last to be cut" logic of FIG. 7A with "data rate is last to be cut" logic to a user-specified degree). Myriad other user interface schemes (including without limitation speech recognition algorithms) will be recognized as well by those of ordinary skill when given the present disclosure.

Moreover, it will be appreciated that the control of the power/data rate tradeoff can be automatically driven by a software application (or even firmware/hardware) within the device. For example, one such control scheme seeks to continually balance the two parameters via control of the radiated power and/or WLAN parameters (e.g., MCS, channel bandwidth, etc.) as previously described. This is basically a multi-variable problem; i.e., given a prescribed thermal limit on one or more components (the proximity of which at any given time may be affected by both internal and external factors such as other components operating within the device enclosure, ambient temperature, exposure to solar radiation, etc.), the algorithm seeks to find "midpoints" for both radiated power and data rate such that neither range nor data rate are maximized. As the overall heat energy balance changes (such as by a user moving the device in direct sunlight on a hot day from indoors), the balancing algorithm senses that at its present (indoor) settings for power/rate, the temperature of one or more critical components is increasing, and accordingly reduces both power and rate incrementally so as to stem the temperature rise. Other such "automatic" schemes will be recognized by those of ordinary skill, such as e.g., where the microcontroller 150 or other logical process within the device senses that physical channel quality is degrading (which may be to fading, interference, etc.) such as by measuring received signal strength (e.g., RSSI) from an AP or mobile device, uncorrected BER, or some other metric of channel quality, and then increasing radiated power incrementally so as to maintain a minimum acceptable channel quality (and thus trading other functionality such as data rate so as to obey thermal limitations).

EXAMPLE NO. 5

In another exemplary embodiment, the air interface comprises a WiMAX (IEEE Std. 802.16e) interface with OFDM (orthogonal frequency division multiplexing) and MIMO. One parameter that may be varied includes the scheduled time slot duration (i.e., the scheduled time slot can enlarge and contract, but remains assigned to the subscriber station, which means that other subscribers cannot use it). By reducing the duration of the slot, less power is utilized (since less processing is required per unit time), thereby reducing heat generation within the transceiver. Additionally, the aforementioned scheduling algorithm also allows the base station to control QoS parameters by balancing the time-slot assignments among the application needs of the subscriber stations, thereby increasing bandwidth efficiency. Each of these different states may result in different subscriber transmitter power/processing requirements, thereby forming a basis for a thermal management "hierarchy" of the type previously described for Wi-Fi™.

Additionally, as with Wi-Fi™, the spatial diversity (i.e., use of MIMO) can be selectively employed which corresponds to different thermal states.

Business Methods

In another aspect of the invention, methods of doing business relating to the foregoing thermal management capabilities are disclosed.

In one embodiment, the high-performance radio/modem capabilities enabled by the invention (see discussion of FIGS. 7A-7C) can be marketed and leveraged. For example, a device manufacturer or service provider can differentiate their product or service over others based on its increased WLAN range for a given form factor size. The aforementioned GUI-based user control of the range/data rate tradeoff (FIGS. 8-8B) can also be used as a basis of differentiation or to support a higher price; by giving consumers the ability to control how fast and far their WLAN device operates, they will ostensibly be willing to pay more either in terms of initial price or ongoing subscription fees.

In another aspect, the high-performance radio/modem capabilities enabled by the present invention can provide a greater flexibility in industrial designs and transceiver selections. A device manufacturer can for example use "expected" wireless performance levels or parameters as a guideline, to include a high performance radio within a smaller industrial design. In that an "attractive" or practical enclosure (from a consumer's perspective) may command more of a market premium than increased wireless range, a manufacturer may opt to address the needs or desires of such consumers by trading off enclosure size for wireless capabilities (i.e., fielding aggressively small form factors which would have less wireless range or other related capability than if a larger enclosure were used). Hence, the present invention also envisions a line or family of related products which can be selectively tailored to the consumer's preferences. For instance, where the consumer demands greater range or extended data rate capacity, and is less concerned with enclosure size or shape, they can opt for such a variant. Conversely, where size/shape are more critical, a complementary enclosure can be selected. This can be marketed much like that used for personal media devices (e.g., the iPod device manufactured by the assignee hereof), e.g., different shapes, color combinations, capabilities, etc. to fit a given consumer's preference. It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method for providing dynamic thermal control for a wireless transceiver in a portable wireless device, the method comprising:
    determining that the value of a first parameter associated with said portable wireless device in a first operating state exceeds a threshold value; and
    switching said portable wireless transceiver from said first operating state to a second operating state based at least in part on said determining, said second operating state comprising one of a plurality of other operating states that generate less heat within at least a portion of said device than said first operating state;
    wherein said first parameter comprises a temperature associated with at least one component of said device, or a voltage generated by a thermocouple associated with said at least one device, and said plurality of other operating states comprises a spatial multiplexing power save (SM PS) mode state, a reduced channel bandwidth mode state, and an alternate modulation and coding scheme (MCS) mode state.

2. The method of claim 1, wherein said thermocouple resides within said device.

3. The method of claim 1, wherein said threshold value comprises a value determined based on a plurality of different operating conditions for said portable wireless device.

4. The method of claim 1, wherein said steps of determining and switching are continued at least until said value no longer exceeds said threshold value.

5. The method of claim 4, wherein said continued determining and switching comprises utilizing operating states which have progressively lower heat generation rates.

6. The method of claim 4, wherein said switching comprises:
    first reducing at least one of a modulation and coding scheme complexity;
    next reducing the number of spatial streams used for communication; and
    then reducing at least one channel bandwidth.

7. The method of claim 1, wherein said switching comprises forcing the transceiver to enter an idle state via at least traffic shaping.

8. The method of claim 1, wherein said switching comprises a sequence of successive steps, said sequence substantially mitigating step-changes in the performance of said wireless transceiver that would otherwise occur if said sequence were not followed.

9. A method for providing thermal management in a wireless device, the method comprising:
    characterizing a plurality of adjustable operating parameters in terms of their disruption to a communications link when adjusted, said act of characterizing producing a listing ordered from least disruptive to most disruptive for said plurality of adjustable operating parameters;
    evaluating a thermally-related parameter of the wireless device; and
    when said thermally-related parameter exceeds a threshold, adjusting individual ones of said plurality of said operating parameters in said listing order so as to reduce said thermally-related parameter below said threshold;
    wherein said thermally-related parameter comprises a temperature associated with at least one component of said device, or a voltage generated by a thermocouple associated with said device, and said plurality of said operating parameters comprises a spatial multiplexing power save (SM PS) mode state, a reduced channel bandwidth mode state, and an alternate modulation and coding scheme (MCS) mode state.

10. The method of claim 9, wherein said at least one component of said device comprises a wireless transceiver.

11. The method of claim 9, wherein said characterizing a plurality of adjustable operating parameters in terms of their disruption to a communications link when adjusted comprises evaluating a plurality of state changes for said wireless transceiver, said state changes comprising:
    a state change from a multi-stream modulation to a single stream modulation;
    a state change from one combination of modulation type and code rate to another combination of modulation type and code rate; and
    a state change from a first channel bandwidth to a second channel bandwidth of lesser value.

12. A method of thermal management in a wireless device having a wireless transceiver, the method comprising:

determining whether a thermal value of said wireless device, when operating in conjunction with said wireless transceiver, exceeds a threshold value; and adjusting one or more operating modes for said wireless transceiver by considering at least said determined thermal value and a current operating mode for said wireless transceiver;

wherein said thermal value comprises a temperature associated with at least one component of said device, or a voltage generated by a thermocouple associated with said device, and said one or more operating modes comprise a spatial multiplexing power save (SM PS) mode, a reduced channel bandwidth mode, and an alternate modulation and coding scheme (MCS) mode.

13. The method of claim 12, wherein said wireless transceiver comprises an OFDM-based modulation scheme and multiple input, multiple output (MIMO) antenna functionality.

14. The method of claim 13, wherein said wireless transceiver comprises a transceiver compliant with IEEE Std. 802.11n, and said current operating mode comprises a modulation and coding scheme (MCS) index value which exceeds a predetermined index threshold value.

15. The method of claim 14, wherein said one or more of respective operating modes to be adjusted comprises an MCS index value, and said act of adjusting comprises repeating said acts of determining and adjusting until either said thermal threshold value is no longer exceeded, or said current MCS index no longer exceeds said index threshold value.

16. The method of claim 12, wherein said adjusting one or more operating modes for said wireless transceiver by considering at least said determined thermal value and a current operating mode for said wireless transceiver comprises evaluating the proximity of said determined thermal value to said threshold value.

17. The method of claim 12, wherein said thermal value further comprises a time-rate-of-change of temperature (dT/dt) of at least one component of said device.

18. The method of claim 12, wherein said thermal value comprises a model obtained from a model or estimation of the temperature of one or more components of said device based at least in part on data obtained from a plurality of locations within said device, said plurality of locations not comprising said one or more components.

19. A thermal management system for use in a portable device having at least one wireless transceiver, the system comprising:
a controller;
a plurality of environmental sensors in operative communication with said controller; and
a storage device operatively coupled to said controller, said storage device comprising a computer program which, when executed by said controller, performs thermal management according to the method comprising:
evaluating signals from one or more of said sensors in relation to one or more first criteria; and
if said evaluating indicates that thermal management is required, causing said wireless transceiver to change states according to at least a first prescribed order until said thermal management is no longer required;
wherein said criteria comprises a temperature threshold associated with at least one component of said device, or a voltage threshold associated with an individual one of said plurality of sensors associated with said device, and said states comprise a spatial multiplexing power save (SM PS) mode state, a reduced channel bandwidth mode state, and an alternate modulation and coding scheme (MCS) mode state.

20. The system of claim 19, wherein said method further comprises selectively causing said wireless transceiver to change states according to at least a second prescribed order instead of said first prescribed order until said thermal management is no longer required.

21. The system of claim 20, wherein said second prescribed order comprises a more aggressive thermal reduction sequence than that of said first prescribed order, and said evaluating comprises determining that said more aggressive sequence is required.

22. The system of claim 21, wherein said first prescribed order is less disruptive to data communication over at least one channel of said wireless transceiver than said second prescribed order.

23. The system of claim 19, wherein:
said controller comprises a digital microcontroller;
said storage device comprises a RAM, ROM or FLASH memory;
said plurality of sensors comprises a plurality of thermocouples; and
said wireless transceiver comprises an OFDM modulation scheme and a spatially diverse antenna system.

* * * * *